United States Patent
Anđjelković et al.

(10) Patent No.: US 9,898,677 B1
(45) Date of Patent: Feb. 20, 2018

(54) OBJECT-LEVEL GROUPING AND IDENTIFICATION FOR TRACKING OBJECTS IN A VIDEO

(71) Applicant: MotionDSP, Inc., Burlingame, CA (US)

(72) Inventors: Nebojša Anđjelković, Niš (RS); Edin Mulalić, Niš (RS); Nemanja Grujić, Niš (RS); Saša Anđelković, Niš (RS); Vuk Ilić, Niš (RS); Milan Marković, Niš (RS)

(73) Assignee: MotionDSP, Inc., Burlingame, CA (US)

( * ) Notice: Subject to any disclaimer, the term of this patent is extended or adjusted under 35 U.S.C. 154(b) by 0 days.

(21) Appl. No.: 15/289,888

(22) Filed: Oct. 10, 2016

Related U.S. Application Data

(60) Provisional application No. 62/241,132, filed on Oct. 13, 2015, provisional application No. 62/245,874, filed on Oct. 23, 2015.

(51) Int. Cl.
*G06K 9/32* (2006.01)
*G06K 9/00* (2006.01)
(Continued)

(52) U.S. Cl.
CPC ....... *G06K 9/3241* (2013.01); *G06K 9/00718* (2013.01); *G06K 9/00744* (2013.01);
(Continued)

(58) Field of Classification Search
USPC .................................................. 382/103, 224
See application file for complete search history.

(56) References Cited

U.S. PATENT DOCUMENTS

| | | | | |
|---|---|---|---|---|
| 6,263,088 B1 * | 7/2001 | Crabtree | ............... | G01S 3/7865 348/169 |
| 6,295,367 B1 * | 9/2001 | Crabtree | ............... | G01S 3/7865 382/103 |

(Continued)

FOREIGN PATENT DOCUMENTS

CN           101770568              7/2010

OTHER PUBLICATIONS

Bhattacharya, Subhabrata, Haroonldrees, Imran Saleemi, Saad Ali, and Mubarak Shah. "Moving object detection and tracking in forward looking infra-red aerial imagery." In *Machine Vision Beyond Visible Spectrum*, pp. 221-252. Springer Berlin Heidelberg, 2011.

(Continued)

*Primary Examiner* — Ishrat I Sherali
(74) *Attorney, Agent, or Firm* — Dov Rosenfeld; Inventek

(57) ABSTRACT

In one embodiment, a method of determine and track moving objects in a video, including detecting and extracting regions from accepted frames of a video, matching parts including using the extracted parts of a current frame and matching each part from a previous frame to a region in the current frame, tracking the matched parts to form part tracks, and determining a set of path features for each tracked part path. The determined path features are used to classify each path as that of mover or a static. The method includes clustering the paths of movers, including grouping parts of movers that likely belong to a single object, in order to generate one or more single moving objects and track moving objects. Also a system to carry out the method and a non-transitory computer-readable medium that when executed in a processing system causes carrying out the method.

38 Claims, 9 Drawing Sheets

(51) Int. Cl.
*G06T 7/00* (2017.01)
*G06T 7/20* (2017.01)
*G06K 9/62* (2006.01)
*G06K 9/46* (2006.01)

(52) U.S. Cl.
CPC ......... *G06K 9/4609* (2013.01); *G06K 9/6218* (2013.01); *G06T 7/0022* (2013.01); *G06T 7/0081* (2013.01); *G06T 7/0097* (2013.01); *G06T 7/2006* (2013.01); *G06T 7/2033* (2013.01); *G06T 2207/10016* (2013.01)

(56) References Cited

U.S. PATENT DOCUMENTS

| | | | |
|---|---|---|---|
| 6,441,846 B1* | 8/2002 | Carlbom | A63B 24/0021 348/157 |
| 6,724,915 B1* | 4/2004 | Toklu | G06T 7/248 382/103 |
| 7,519,220 B2 | 4/2009 | Aharon et al. | |
| 7,697,756 B2 | 4/2010 | Aharon et al. | |
| 7,706,633 B2 | 4/2010 | Chefd'hotel et al. | |
| 7,725,484 B2 | 5/2010 | Nister et al. | |
| 8,050,454 B2* | 11/2011 | Yi | G06F 17/3079 382/100 |
| 8,300,935 B2* | 10/2012 | Distante | A63B 24/0021 382/103 |
| 8,345,769 B1 | 1/2013 | Diard et al. | |
| 8,358,381 B1 | 1/2013 | Diard et al. | |
| 8,437,558 B1* | 5/2013 | Medasani | G06K 9/6211 382/103 |
| 8,737,684 B2* | 5/2014 | Meloche | G08G 5/065 382/103 |
| 9,002,055 B2* | 4/2015 | Funayama | G06T 7/0081 382/103 |
| 9,396,396 B2 | 7/2016 | Hasegawa et al. | |
| 9,589,595 B2* | 3/2017 | Gao | G06K 9/00664 |
| 9,679,203 B2* | 6/2017 | Bulan | G06K 9/00771 |
| 2005/0225678 A1 | 10/2005 | Zisserman et al. | |
| 2005/0226506 A1 | 10/2005 | Aharon et al. | |
| 2005/0271302 A1 | 12/2005 | Khamene et al. | |
| 2006/0104510 A1 | 5/2006 | Aharon et al. | |
| 2007/0291040 A1 | 12/2007 | Bakalash et al. | |
| 2009/0232358 A1 | 9/2009 | Cross et al. | |
| 2010/0195914 A1 | 8/2010 | Isard et al. | |
| 2011/0313984 A1 | 12/2011 | Zhou et al. | |
| 2012/0288140 A1* | 11/2012 | Hauptmann | G06K 9/00771 382/103 |
| 2012/0314961 A1 | 12/2012 | Isard et al. | |
| 2014/0003709 A1 | 1/2014 | Ranganathan et al. | |
| 2014/0023270 A1 | 1/2014 | Baheti et al. | |
| 2014/0023271 A1 | 1/2014 | Baheti et al. | |

OTHER PUBLICATIONS

Blei D. M., A. Y. Ng, and M. I. Jordan, "Latent dirichlet allocation," *J. Mach. Learning Res.* 3, 993-1022 (2003).

Brown, Andrew P., Kevin J. Sullivan, and David J. Miller. "Feature-aided multiple target tracking in the image plane." In *Defense and Security Symposium*, pp. 62290Q-62290Q. International Society for Optics and Photonics, 2006.

Brox, Thomas, and Jitendra Malik. "Object segmentation by long term analysis of point trajectories." In Computer Vision—ECCV 2010, pp. 282-295. Springer Berlin Heidelberg, 2010.

Chang, Chih-Chung and Chih-Jen Lin. 2011. LIBSVM: A library for support vector machines. *ACM Trans. Intell. Syst. Technol.*, vol. 2, No. 3, Article 27 (May 2011).

Coifman, Benjamin, David Beymer, Philip McLauchlan, and Jitendra Malik. "A real-time computer vision system for vehicle tracking and traffic surveillance."*Transportation Research Part C: Emerging Technologies* 6, No. 4 (1998): 271-288.

Danescu, R., S. Nedevschi, and M. Meineche, "Lane geometry estimation in urban environments using a stereovision system," *Proc. IEEE Transportation Systems Conf.*, Seattle, pp. 271-276 (2007).

Donoser, Michael, and Horst Bischof. "Efficient maximally stable extremal region (MSER) tracking." In *Computer Vision and Pattern Recognition, 2006 IEEE Computer Society Conference on*, vol. 1, pp. 553-560. IEEE, 2006.

El-Sheimym, N. and K. Schwarz, "Navigating urban areas by VISAT—a mobile mapping system integrating GPS/INS/Digital cameras for GIS application," *Navigation* 45, 275-286 (1999).

Forssén, Per-Erik, and David G. Lowe. "Shape descriptors for maximally stable extremal regions." In *Computer Vision, 2007. ICCV 2007. IEEE 11th International Conference on*, pp. 1-8. IEEE, 2007.

Hofmann, T., "Unsupervised learning by probabilistic latent semantic analysis," *Mach. Learning* 42, 177-196 (2001).

John Hoperoft and Richard Carp, "An $n^{5/2}$ algorithm for maximum matching in bipartite graphs," SIAM J. Computing, vol. 2, No. 5, pp. 225-231, Dec. 1973.

Iqbal, Kamran, Xu-Cheng Yin, Xuwang Yin, Hamza Ali, and Hong-Wei Hao. "Classifier comparison for MSER-based text classification in scene images." In*Neural Networks (IJCNN), The 2013 International Joint Conference on*, pp. 1-6. IEEE, 2013.

Jones, R., B Ristic, N.J. Redding, D.M. Booth, "Moving Target Indication and Tracking from Moving Sensors," *Digital Image Computing: Techniques and Applications, 2005. DICTA '05. Proceedings 2005*, pp. 46,46, Dec. 6-8, 2005.

Jones, R, D. M. Booth, and N.J. Redding, "Video moving target indication in the Analysts' Detection Support System," Tech. Report No. DSTO-RR-0306. Intelligence Surveillance and Reconnaissance Div, Defence Science and Technology Organisation (DSTO), Edinburgh, South Australia (Australia) 2006.

Kang, Jinman, Isaac Cohen, Gérard Medioni, and Chang Yuan. "Detection and tracking of moving objects from a moving platform in presence of strong parallax." In *Computer Vision, 2005. ICCV 2005. Tenth IEEE International Conference on*, vol. 1, pp. 10-17. IEEE, 2005.

Kelman, A., M. Sofka, and C. V. Stewart, "Keypoint descriptors for matching across multiple image modalities and non-linear intensity variations," in *Proc. of IEEE Conf. on Computer Vision and Pattern Recognition*, Minneapolis, pp. 1-7 (2007).

Kim, Z., "Robust lane detection and tracking in challenging scenarios," *IEEE Trans. Intell. Transp. Syst.* 9, 16-26 (2008).

Kreucher K., and S. Lakshmanan, "LANA: a lane extraction algorithm that uses frequency domain features," *Robot. Autom.* 15, 343-350 (1999).

Lin, Liang, Yongyi Lu, Yan Pan, and Xiaowu Chen. "Integrating graph partitioning and matching for trajectory analysis in video surveillance." *Image Processing, IEEE Transactions on* 21, No. 12 (2012): 4844-4857.

Liu, D. and T. Chen, "Unsupervised image categorization and object localization using topic models and correspondences between images," in *Proc. of 11th Int. Conf. on Computer Vision*, Rio de Janeiro, pp. 1-7 (2007).

Lowe, D. G., "Distinctive image features from scale-invariant key-points," *Int. J. Comput. Vis.* 60, 91-110 (2004).

Lu, Wei-Lwun, Jo-Anne Ting, Kevin P. Murphy, and James J. Little. "Identifying players in broadcast sports videos using conditional random fields." In*Computer Vision and Pattern Recognition (CVPR), 2011 IEEE Conference on*, pp. 3249-3256. IEEE, 2011.

Martinez-Garcia, Edgar A., and Dulce Torres. Robot Visual Odometry by Tracking, Rossum 2011 Jun. 27-28,2011 Xalapa, Ver., Mexico. Retrieved Jul. 23, 2015 from http://www.uv.mx/rossum/CD/papers/029.pdf.

Matas, J., O. Chum, M. Urban, and T. Pajdla, "Robust wide baseline stereo from maximally stable extremal regions," in Proc. of 13th British Machine Vision Conf., Cardiff, Wales, pp. 384-393 (2002).

McCall, J. C., and M. M. Trivedi, "Video-based lane estimation and tracking for driver assistance: survey, system, and evaluation," IEEE Trans. Intell. Transp. Syst. 7, 20-37 (2006).

(56) References Cited

OTHER PUBLICATIONS

Matas, Jiri and Karel Zimmermann "A New Class of Learnable Detectors for Categorisation," In Proceedings of 14th Scandianavian Conference on Image Analysis (SCIA'05), pp. 541-550, LNCS 3540,2005.

Mikolajczyk, K. and C. Schmid, "A performance evaluation of local descriptors," IEEE Trans. Pattern Anal. Mach. Intell. 27,1615-1630 (2005).

Mikolajczyk, K., T. Tuytelaars, C. Schmid, A. Zisserman, and J. Matas, "A comparison of affine region detectors," Int. J. *Comput. Vis.* 65, 43-72 (2005).

Niebles, J. C., H. Wang, and L. Fei-Fei, "Unsupervised learning of human action categories using spatial-temporal words," *Int. J. Comput. Vis.* 79, 299-318 (2008).

Obdrázlek, S., "Object recognition using local affine frames," PhD thesis, Center for Machine Perception, Faculty of Electrical Engineering, Czech Technical University, Prague, Czech Republic, Sep. 2006.

Obdrázlek,,Stepan, and Jiri Matas. "Object Recognition using Local Affine Frames on Distinguished Regions." In BMVC, vol. 1, p. 3. 2002.

Rao, Shankar R., Roberto Tron, René Vidal, and Yi Ma. "Motion segmentation via robust subspace separation in the presence of outlying, incomplete, or corrupted trajectories." In *Computer Vision and Pattern Recognition, 2008. CVPR 2008. IEEE Conference on*, pp. 1-8. IEEE, 2008.

Samadzadegan, F. , A. Sarafraz, and M. Tabibi, "Automatic lane detection in image sequences for vision-based navigation purposes," in *Proc. of Int. Soc. for Photogrammetry and Remote Sensing Commission V Symp.*, Dresden, pp. 251-257 (2006).

Sivic, J., B. Russell, A. Efros, A. Zisserman, and W. Freeman. "Discovering objects and their location in images," in Proc. of 10th IEEE Int. Conf. on Computer Vision, Beijing, pp. 370-377 (2005).

Wang, X., X.Ma, and W.E. Grimson,"Unsupervised activity perception in crowed and complicated scenes using hierarchical Bayesian models," IEEE Trans. Pattern Anal. Mach. Intell. 31, 539-555 (2009).

Wills, Josh, Sameer Agarwal, and Serge Belongie. "What went where [motion segmentation]." In Computer Vision and Pattern Recognition, 2003. Proceedings. 2003 IEEE Computer Society Conference on, vol. 1, pp. I-37. IEEE, 2003.

Yilmaz, Alper, Omar Javed, and Mubarak Shah. "Object tracking: A survey."Acm computing surveys (CSUR) 38.4 (2006): vol. 13.

Yasin, Hashim, BjörnKrüger, and Andreas Weber. "3D Reconstruction of Human Motion from Video." (2013). Retrieved Aug. 26, 2016 from http://cg.cs.uni-bonn.de/aigaion2root/attachments/yasin2013b.pdf.

Fauqueur, Julien, Gabriel Brostow, and Roberto Cipolla. "Assisted video object labeling by joint tracking of regions and keypoints." *Computer Vision, 2007. ICCV 2007. IEEE 11th International Conference on*. IEEE. 2007.

"Kanade-Lucas-Tomasi feature tracker" available at https://en.wikipedia.org/wiki/Kanade-Lucas-omasi_feature_tracker.

Oh, Il-Seok, Jinseon Lee, and Aditi Majumder. "Multi-scale image segmentation using MSER." *International Conference on Computer Analysis of Images and Patterns*. Springer Berlin Heidelberg, 2013.

Riemenschneider, Hayko, "Online Object Recognition using MSER Tracking," Master's Thesis, Graz University of Technology, Erzherzog-Johann-Universit at Graz, Jan. 2008, available Feb. 14, 2017 at www.vision.ee.ethz.ch/~rhayko/paper/thesis2008_master_riemenschneider.pdf.

Duc Phu Chau, Francois Bremond, Monique Thonnat, and Etienne Corvee,"Robust Mobile Object Tracking Based on Multiple Feature Similarityand Trajectory Filtering," The International Conference on Computer Vision Theory and Applications (VISAPP) (2011).

Michael Teutsch, Thomas M¨ uller, Marco Huber, and J¨ urgen Beyerer , "Low Resolution Person Detection with a Moving Thermal Infrared Camera by Hot Spot Classification," IEEE Conference on Computer Vision and Pattern Recognition (CVPR) Workshops, 2014, pp. 209-216.

Vedaldi, Andrea. "An implementation of multi-dimensional maximally stable extremal regions." Feb. 7, 2007: 1-7, retrieved Mar. 14, 2017 at https://pdfs.semanticscholar.org/ae34/c2f21184a7b70e18c0094037482ff33986c5.pdf.

Mikolajczyk, Krystian, Tinne Tuytelaars, Cordelia Schmid, Andrew Zisserman, Jiri Matas, Frederik Schaffalitzky, Timor Kadir, and Luc Van Gool. "A comparison of affine region detectors." *International journal of computer vision* 65, No. 1-2 (2005): 43-72.

L. Zhang, G. J. Dai, C. J. Wang, "Human Tracking Method Based on Maximally Stable Extremal Regions with Multi-Cameras", Applied Mechanics and Materials, vols. 44-47, pp. 3681-3686, Dec. 2010.

\* cited by examiner

OBJECT-LEVEL GROUPING AND IDENTIFICATION FOR TRACKING OBJECTS IN A VIDEO

RELATED APPLICATION

The present invention claims priority of U.S. Provisional Patent Applications Nos. U.S. 62/241,132, filed 2015 Oct. 13 and U.S. 62/245,874, filed 2015 Oct. 23, each such application to Applicant Motion DSP, Inc. with inventors An đelković, et al. The contents of each of U.S. 62/241,132 and U.S. 62/245,874 are incorporated herein by reference, except in any jurisdiction where incorporation by reference is not permitted. In such jurisdictions, any portion of either of both of said U.S. 62/241,132 and U.S. 62/245,874 may be inserted into the present application by amendment.

FIELD OF THE INVENTION

The present invention relates to identifying and tracking objects in a video captured from at least one camera.

BACKGROUND

Video tracking, also called VMTI filtering (video motion tracking indication filtering) is a process of detecting and uniquely identifying moving objects in a video sequence, e.g., as captured by a video camera. The information determined can be used in a variety of applications, e.g. traffic monitoring, security surveillance, etc.

One class of video tracking systems use a feature detector to detect features, e.g., regions in an image (a frame) of an input video, then match the detected features from frame to frame, including using a motion model to determine paths for each detected part. These paths are classified into those of moving objects and those of static objects. These paths are then grouped into individual objects. The classification and grouping may be prone to errors, for example, parts of different paths may be erroneously grouped into a single path because of overlapping paths, and also a path of a single object may be erroneously separated into two objects.

BRIEF DESCRIPTION OF THE DRAWINGS

FIGS. 9A and 9B how two objects can be incorrectly fused into a larger object, while

DETAILED DESCRIPTION

Overview

Figure 1:
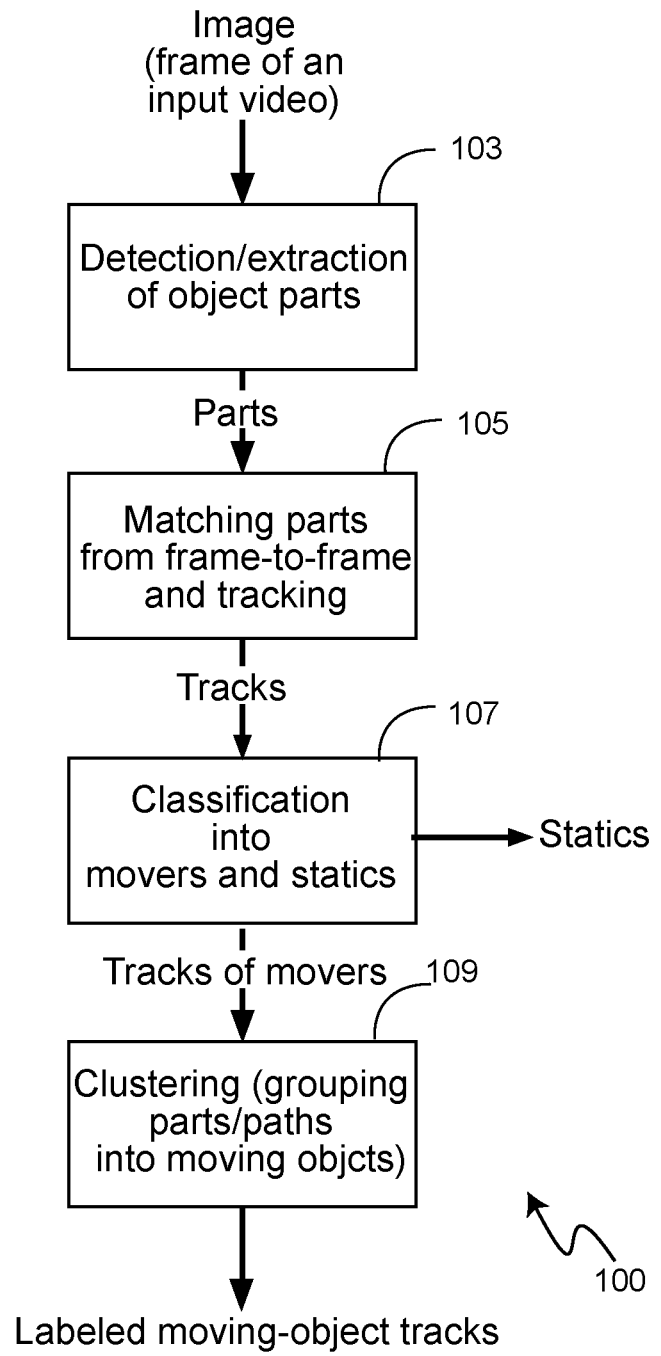
FIG. 1 shows a flowchart of a method embodiment of the invention after a plurality of frames of a video is accepted by the machine carrying out the method.

Particular embodiments of the invention include a video tracking method, a --transitory medium containing computer-readable instructions that when executed carries out the video tracking method, and a video tracking system. An important application is carrying out video tracking in videos obtained from one or more airborne cameras.

One set of embodiments of the present invention relates to a method of operating a hardware system to process video that includes a sequence of frames, the method to determine and track moving objects in the video. The method comprises accepting frames of a video, e.g., from a source of video data such as a video camera, a computer-readable file, a packetized video stream, and so forth. The method further comprises detecting and extracting regions from an accepted frame, e.g., extremal regions, or maximal stable extremal regions (MSER), each region possibly being a part of an object. The method further comprises matching and tracking parts, including using the extracted parts of a current frame and matching each part from the previous frame to match to a region in the current frame, and further to track parts to form part tracks. The part tracking comprises changing of reference frames from time to time, e.g., periodically such that the tracking being in relation to the most recent reference frame or frames. The part tracker also may comprise from time to time, e.g., periodically introducing new parts to track that were not previously matched. The method further comprises, for each tracked part path, to determine a set of path features, and to classify using the path features, each path as that of a moving part (a mover) or a stationary path (a static). The method further comprises clustering the paths of movers, including grouping parts of movers that likely belong to the same object in order to generate moving objects and the tracking thereof. In some versions, the clustering comprises, for a frame, determining a set of connectedness features that capture the relationship between pairs of movers in the frame. In one embodiment, such connectedness features include features related to a velocity difference, proximity of the parts, overlap between the parts, and background similarity of respective background of the parts. These connectedness features are normalized, such that the method robust to scale. The clustering includes estimating two sets of probability functions (in some versions, two joint probability density functions) for the connectedness features, a first set for features of pairs belonging to the same part and a second set for features of pairs not belonging. One aspect of some embodiments is that the estimated probability function sets are obtained by supervised learning using a training set of videos containing static and moving parts that have been manually grouped into objects, i.e., that are pre-labeled. The clustering uses these estimated probability functions to determine a measure of probability of any two pairs of parts belonging to the same object, with any probability measure less than a pre-defined or user selected threshold being indicative of no connection.

The clustering further may comprise matching of moving objects between frames by determining correspondences between each candidate object in the current frame with objects in the previous frame. In one version, the clustered determines a measure of correspondence from current frame's candidate groupings to past object groupings based on the numbers of parts in a candidate object that are in objects that contain the respective parts in all previous frame. The clustering further may carry out bipartite matching to find the best correspondences for propagation of object groupings from frame to frame.

Another aspect of the method is that the clustering comprises short interval grouping (SIG) filtering that can eliminate some short interval erroneous groupings, the SIG filtering using hysteresis filtering of an objects stability, i.e., whether or not a part of an object of a current frame is the same as the previous one or more frames to ensure stable labeling.

A second set of embodiments of the present invention relates to a system for processing video that includes a sequence of frames to determine and track moving objects in the video. The system may be constructed, by programming and/or specialized hardware modules, to carry out the steps of the method embodiments described above for identifying the different moving objects in each of the frames. The system may include or be connectable to a source of video frames such as an imaging device for receiving the video data. The system comprises a region-extractor that uses features such as MSERs or to extract regions, e.g., extremal regions that may be part of one or another object from each frame. The extracted parts of a current frame are used by a part matcher and tracker that includes a trail data structure maintaining for each tracked part the track, e.g., as a list of coordinates. The part matcher and tracker comprises a part tracker that is operable to match each part from the previous frame to a region in the current frame, and further comprises a part tracker that tracks parts to form part tracks. The part tracker may changes reference frames from time to time, e.g., periodically with tracking being in relation to the most recent reference frame. Additionally, from time to time, e.g., periodically, e.g., in every frame or every few frames, parts that were not matched by the matcher may be introduced by the tracker as new parts to be tracked. In one embodiment, parts are tracked for a pre-pre-defined or user-defined amount of time, e.g., for the time corresponding to the number of reference frames in maintained by the system.

The system further comprises a part path classifier operative to accept tracked part paths, to determine a set of path features, and to use the path features to classify each path as that of a moving part (a mover) or a stationary path (a static). The system further comprises a part-path clusterer, operative to accept the paths of movers and to group parts that likely belong to the same object in order to generate moving objects and the tracking thereof. The clusterer when operating determines, for each frame, a set of connectedness features that capture the relationship between pairs of movers in the frame. In some versions, the features relate to the velocity difference (speed and direction), proximity of the parts, overlap between the parts, and background similarity of respective background of the parts. These connectedness features are normalized, such that the system is robust to scale. The clusterer is operative to estimate two sets of probability functions for the connectedness features, a first set for features of pairs belonging to the same part and a second set for features of pairs not belonging. The estimated probability function sets are obtained by supervised learning using a training set of videos containing static and moving parts that have been manually grouped into objects, i.e., that are pre-labeled. The clusterer uses these estimated probability functions to determine a measure of probability of any two pairs of parts belonging to the same object, with any probability measure less than a pre-defined or user selected threshold being indicative of no connection. Thus, the clusterer carries analysis is carried out for pairs of moving objects in the current frame, leading to a candidate set of groupings for the current frame.

The part-path clusterer is further operative to carry out matching of moving objects between frames by determining correspondences between each candidate object in the current frame with objects in the previous frame by determining a measure of correspondence from the current frame's candidate groupings to past object groupings based on the numbers of parts in a candidate object that are in objects that contain the respective parts in all previous frame. The clusterer further is operative to carry out bipartite matching to find the best correspondences for propagation of object groupings from frame to frame.

Another aspect of embodiments of the system is the inclusion in the clusterer of a short interval grouping filter that can eliminate some short interval erroneous groupings, for example an erroneous grouping when two overtaking objects are fused in the short term to a single object, or when an object is temporarily and erroneously split into two objects before being labeled later as a single object. The short term interval grouping filter uses hysteresis filtering of an objects stability to ensure stable labeling.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION OF SOME EMBODIMENTS

In the remainder of this document, citations are provided within square brackets, and a list of cited references is provided towards the end of the description.

A first set of embodiments of the present invention relates to a machine-implemented method of carrying out identification and tracking of objects from one or more videos, each video comprising a respective sequence of frames, each an image. In the description, we assume a monochrome video of frames, each a set of pixels arranged as an array. In the example embodiments described herein, each frame of the video is first preprocessed to a common frame size of 640×480 pixel monochrome image. Further, in the examples described, the video is at 30 fps (frames per second). However, the invention is not limited to such input. The input video can be any resolution, e.g., 1280×960 (as in 1080i and 1080p video), or 320×240 pixels, etc., 30 fps, 60 fps, etc., even 240 line 15 fps videos. Furthermore, the video may be monochrome, color, or multispectral. For a color image, in one embodiment, the 640×480 pixel monochrome image is the luminance or intensity of the color image. For multispectral images, many possibilities exit, e.g., concatenating the individual components, processing the nonvisual components separately as separate monochrome images, and so forth. We have tested the method and system on several other resolutions and frame rates, e.g., on 240 line 15 fps videos.

Figure 11:
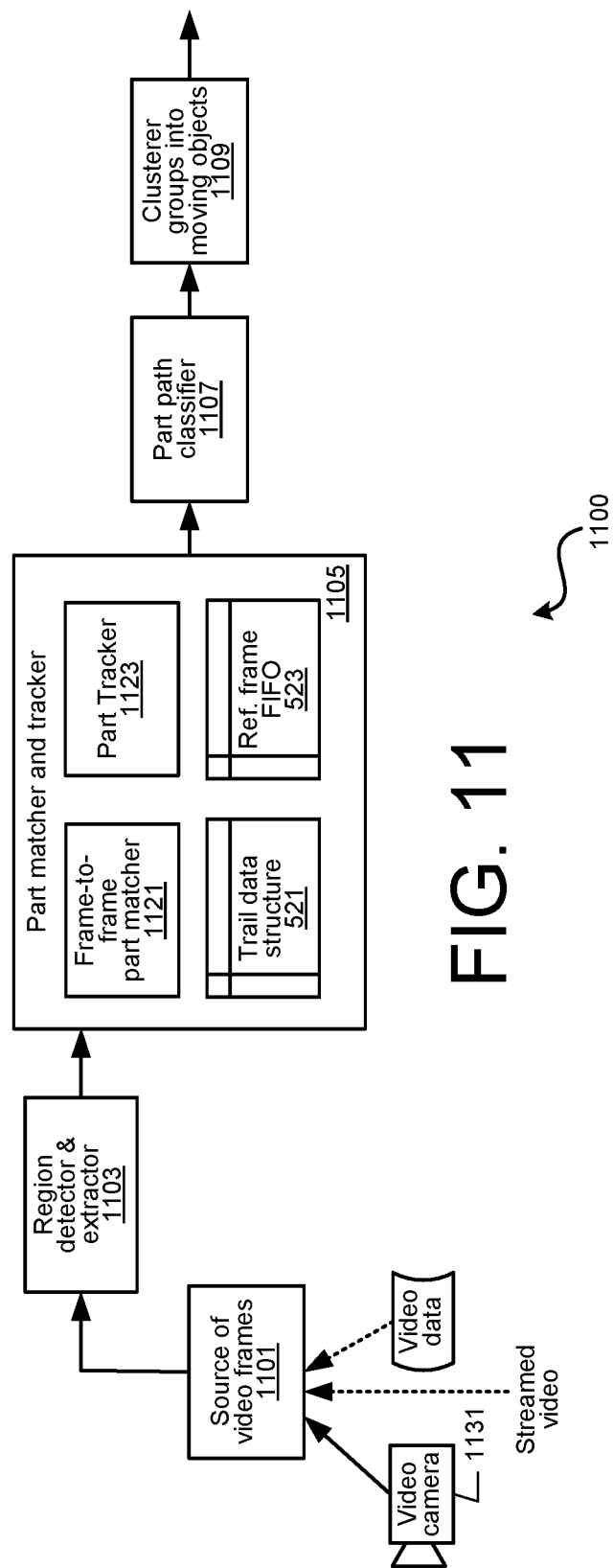
FIG. 11 shows a simplified block diagram of an example system for detecting moving objects in a video, such system including aspects of the present invention.
Figure 12:
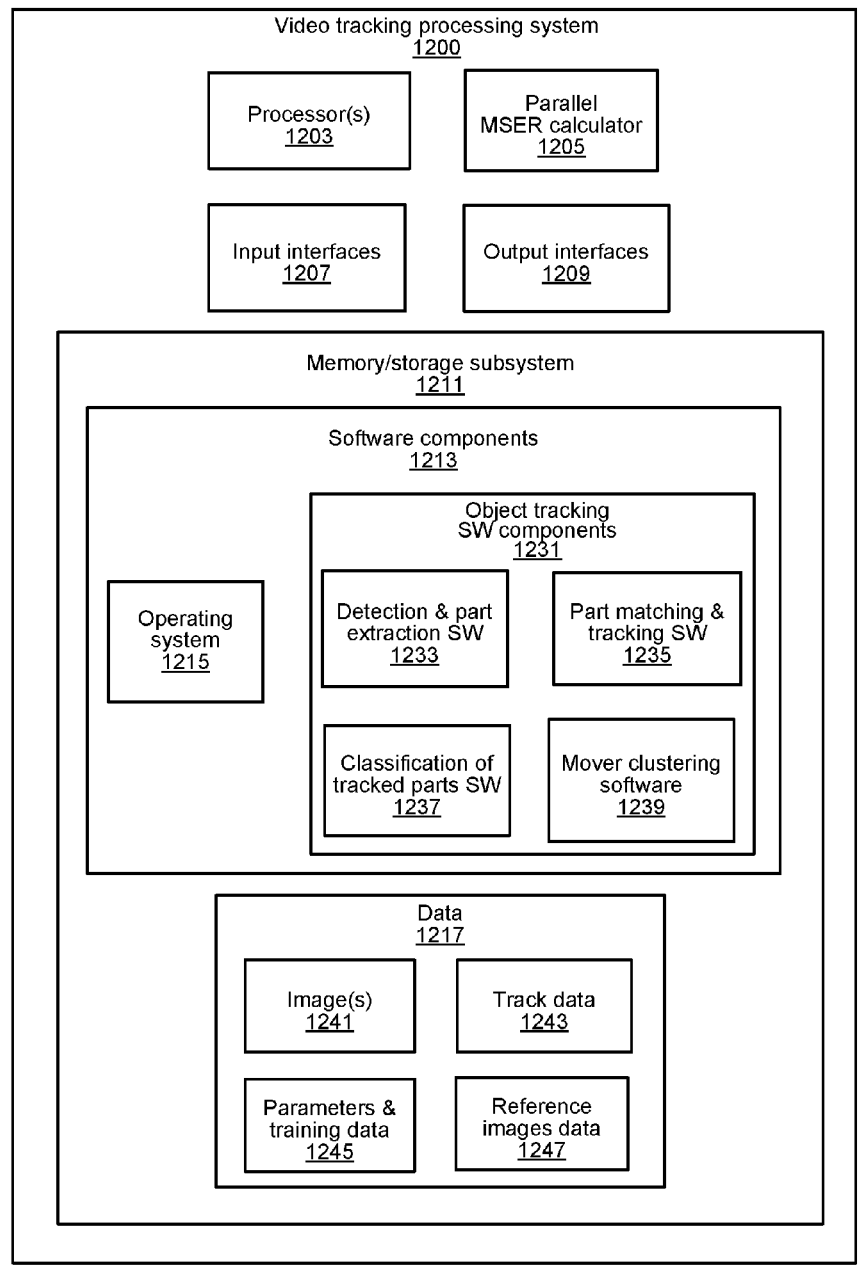
FIG. 12 shows a simplified block diagram of processing system implementation of a system for detecting moving objects in a video, such system including aspects of the present invention.

Suppose a plurality of frames of a video are accepted into the video tracking system 1100 shown in FIG. 11 (one version of such a system 1100 implemented using one or more processing systems, as shown in FIG. 12). FIG. 1 shows a simplified flow chart of subprocesses carried out according in one embodiment of a video tracking method 100. The frames of the video may be accepted into the hardware frame-by-frame, wherein, after a current frame is accepted, at any subprocess, included in or obtained from the current frame may be stored (buffered) for later use in other subprocesses. The method 100 comprises:

An object part detecting subprocess 103, comprising for each input video frame detecting regions using a region (feature) detector, the detected regions representing parts of objects (object parts).

A matching and tracking subprocess 105, comprising associating detected object parts from frame to frame and tracking the object parts, resulting in tracks (set of positions over time of an object part).

A classification subprocess 107, comprising determining whether the detected and tracked object paths (detected region features) belong to parts of moving objects (movers) or parts of static objects (statics).

A clustering subprocess 109, comprising grouping, for each moving object, object part paths that belong to that moving object, and identifying each object across the scene of the frame(s) with a respective unique identifier (ID).

Region-Feature Detection and Segmentation

In subprocess 103 of video tracking method 100, region features in each frame, e.g., in the current frame, are detected, and from these regions extracted from the frame. In one embodiment, an MSER (Maximally Stable Extremal Regions) detector is used to extract both positive and negative MSERs and from these to extract blob-like regions (we call these MSERs, also parts) for every input video frame. Note that alternative embodiments may use another type of feature detector in addition or instead of using MSER. One alternate version, for example, uses the well-known SIFT (Scale Invariant Feature Transformation) detector. However, for our purpose, we found that using an MSER detector yields good results, and such is used in one embodiment of the invention. For any frame, the result of subprocess 103 is a set of MSERs, stored, e.g., as a list of MSERs, called a "part-list" herein for the frame. The MSERs may represent parts of objects. The method assigns an identifier (call it a "part-ID") for each MSER. In later frames, a detected MSER may be determined to be previously detected MSER, so the newly detected MSER maintains the same part-ID. In any frame, each MSER has a one or more properties, e.g., the location of its centroid, e.g., as an x,y pair, and such information is maintained in the part list. This part list is made available to the other subprocesses. Note also that detecting MSERs also may detect extremal regions that are not maximal.

In the remainder of this document, the word "part" might be used interchangeably with "MSER" to refer to the detected MSERs and later-processed MSERs.

Matching and Tracking

Matching and tracking subprocess 105 of method 100 tracks detected parts through the frames as frames are accepted into the method. Each frame has several parts, e.g., represented by a list. As a result of tracking, each part has a set of locations of the part's locations over time, called a track, so a track can be represented as a list of coordinates, so such that all the parts' tracks over time can be described by a list of part tracks, i.e., a list of lists. One embodiment of the invention maintains and updates the list of lists (called a "trail" herein) as information about all the parts is obtained as more and more frames are accepted. For a part in a given frame that is found in the next frame, the information on that part is updated (and identified by the part-ID). Additionally, one aspect of our tracking is the adding from time to time of any one or more new parts that do not correspond to any previously encountered parts, wherein for each new part, a new respective list (for a part track) with a new part-ID is created in the list of lists. Rather than the searching and adding of not previously encountered MSERs being carried out for each new frame accepted into the system, one embodiment of the method only introduces new parts to track from time to time, e.g., periodically every $K_F$ frames, i.e., at each $K_F$'th frame. Period $K_F$ is called the new-part-updating period herein, and may be a settable parameter. For 30 fps (frames per second) video, one embodiment uses $K_F=1$, meaning we add new parts every new frame. In another embodiment, we $K_F=15$, representing ½ second. In yet another embodiment, $K_F=30$.

Figure 5:
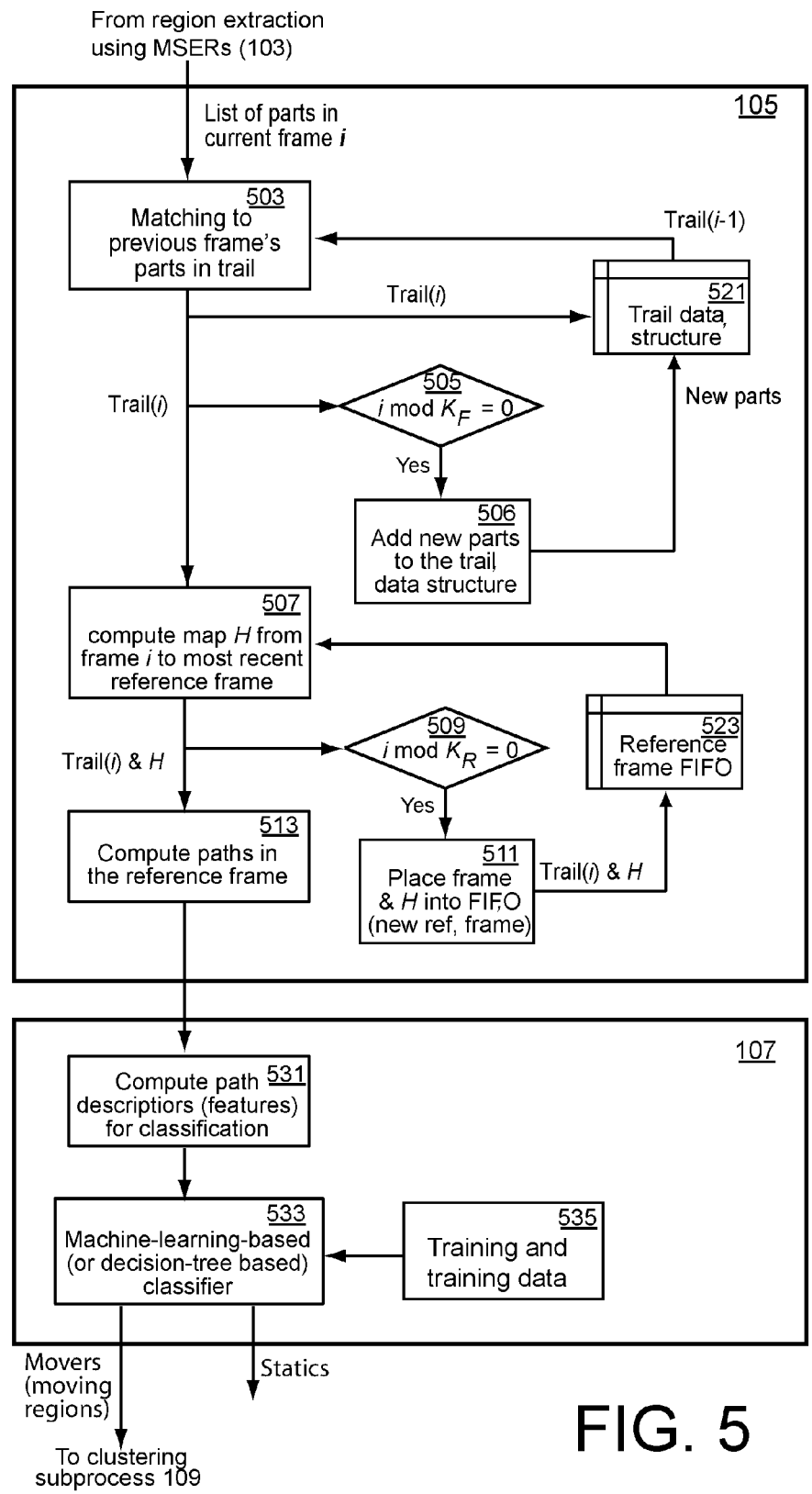
FIG. 5 shows a simplified flow chart of a matching and tracking subprocess, and of a classification subprocess according to an embodiment of the present invention.

In more detail, initially, for the first frame of the video, detection process 103 detects (extracts) a set of parts, assigns to each part a part-ID, and generates a part list, each respective part in the part list having the respective newly assigned part-ID. FIG. 5 shows a simplified flow chart showing subprocess 105 that includes tracking parts extracted in subprocess 103, and generating a path, e.g., as a list of coordinates for each part. FIG. 5 also shows a simplified subprocess 107 of classifying paths into paths of moving parts and paths of stationary parts.

Referring first to tracking, since each tracked part has a list of its properties as it is being tracked, the list of parts from extracting subprocess 103 becomes a list of lists, stored in a data structure 511. Consider a current frame (the ith frame) accepted into the system and the extremal (not just maximum extremal) regions detected therein in 103.

Subprocess 105 has access to the part-list (the list of lists, also called trail data structure 521) that includes all MSERs encountered in the previous (the (i−1)'th) frame. Consider an existing part in the previous frame. In 503, subprocess 105 searches for an extremal region in the current frame that matches a previously encountered part, the matching according to a matching criterion, e.g., by matching a set of features of a region. If a match is found, subprocess 105 updates the part list with information on the matched part in the current frame. Those parts that are matched have the same part-ID frame to frame.

Furthermore in 505, if 1 mod $K_F=0$, subprocess 105 updates the part-list in the train data structure 521 with newly detected MSERs.

In more detail, for any connected region, e.g., an MSER or any extremal region, one may calculate a set of features. We call these features region-features. Suppose we calculate $N_D$ such region features. The set of $N_D$ region features may form an $N_D$-vector of such features of a region, which we call a region-feature vector. Subprocess 105 maintains a region-feature vector of each MSER in the list of paths data structure (trail data structure 521). To match an MSER in the previous frame (call it an input MSER) with (extremal) regions detected in the current frame, the method in 503 uses a distance measure to compare the input MSER's region-feature vector with the feature vectors of all extremal regions (not just MSERs) within a provided search radius (search extent) in the current frame. The search extent of course depends on the speed that parts might be moving. In one embodiment, the search extent, expressed in pixels, is a settable parameter. In one embodiment, three values are available, and selected according to expected speeds of objects. One embodiment uses three search extents: 20, 40, and 80 pixels. The default value is 20 pixels. In one embodiment, the distance measure for searching for a match is a weighted L2 norm (weighted Euclidean distance), where the weights indicate the relative importance of any region feature in the region-feature vector. In one embodiment, dataflow box 503 selects the extremal region in the current frame that is closest in features to the input MSER, i.e., has a region-feature vector that has the lowest distance measure to the input MSER. This is carried out for each MSER being tracked.

One embodiment calculates the following region features to form the region-feature vector of a region: a measure of the mean gray value in the region, a measure of the region's area, the location of the region's centroid, and one or more measures of the region's size, e.g., the area of the region and the width and height of the bounding box of the region. One version further includes the stability of the extremal region. How to calculate such region features would be known to those in the art. The set of respective weights for each respective region feature can be pre-defined according to importance to form a pre-defined weight vector. Different weight vectors can be defined for each different type of video. In some versions, the respective weights for the respective region features can be learned using training videos—actual videos with known objects therein. Again, different types of reference videos can be used in the learning to generate different weight vectors appropriate for videos like the respective training video.

Additionally, every $K_F$ frames (the first frame being frame 0), i.e., responsive to l mod $K_F$=0, in 505 and 506, any parts detected in the current frame that were not matched in 503 to any part in the previous frame, are added to the list of lists, and tracked from frame i forward. Note that in one embodiment, $K_F$=1 new parts are added for each frame entering the method;

Also note that based on so-detected and tracked parts, a homography between any two previous frames may be calculated. In one embodiment, point correspondences are extracted from parts being tracked in both frames and a homography between the frames is estimated using the well-known RANSAC (RANdom SAmple and Consensus) method, used widely in the field of computer vision, in particular in the computation of scene homographies.

Using Reference Frames

For any part (MSER) being tracked, the part's path is needed for further analysis, for example for classifying tracked parts into those of objects that are moving (movers) and those that are stationary (statics). The method carries out such analysis within a selected time interval, i.e., a window wherein the background (of statics) is unlikely to change. In one embodiment, a window size of 60 frames (2 s in a 30 fps video) is used, and other embodiments may use different window sizes, e.g., 30 frames, depending on the expected speed of background changes, e.g., for an airborne camera, depending on the speed of the airborne vehicle on which the camera is mounted. The locations of a tracked MSER, e.g., the locations of the MSER's centroid within any time interval are in one embodiment defined in relation to a reference frame. Recall a path of a part is a list. In one embodiment, the list is of coordinates, e.g., x,y coordinates of centroids of the part, each coordinate being expressed as a mapping to some reference video frame. For example, for an interval of 60 frames, one embodiment defines the path of a tracked part as a list or array of 60 elements, each elements representing x,y coordinates of the part at consecutive frames for that path. The reference frame is the same for all tracked parts in an analysis interval of 60 frames. One simple choice of a reference frame is to use the first frame of the video—denoted frame 0—as the reference frame for all paths. However, it would then be a problem to track a part in some distant frame, e.g., frame 1000, in the case of a videos from a rapidly moving camera, e.g., an airborne camera, because there likely would be no common region-features between them; it would not be possible to determine correct alignment. One possible solution is to use a concatenation of in-between homographies. However, the homographies may have error, and after a while, there could be a significant accumulation of error such that extracted paths will differ from those in reality, possibly leading to misclassifications.

To avoid such problems, one aspect of subprocess 105 that we call reference-frame shifting comprises changing reference frames from time to time. In one embodiment, the interval between reference frames is constant, such that reference frames are periodic. In one embodiment, the period between reference frames, denoted $K_R$ is 15 frames. The method includes maintaining a number denoted $N_R$ of reference frames in a FIFO (First In First Out) buffer or a similar mechanism, shown as structure 523 in FIG. 5. In one embodiment the buffer 523 maintains five reference frames. Clearly this number $N_R$ can be a settable parameter, or can be preset to a number other than 5. The method includes maintaining for each reference frame a mapping to its most previous reference frame in the FIFO buffer. Thus, in 507 a mapping of frame i to the previous reference frame is maintained. In 509, it is determined if the current frame is to be a reference frame by ascertaining whether i mod $K_R$=0 and responsive to i mod $K_R$=0, in 511, the current frame i is placed in the FIFO 523, and marked as the reference frame from this point forward. The mapping (homography) denoted H between the reference frame and the last used reference frame also is maintained. In one embodiment, the parts in the reference frame are tracked starting at the new reference frame that is mapped to that reference frame. As more and more frames are accepted by the method, every $K_R$ frames, a new frame becomes the newest reference frame in the buffer, and the oldest reference frame in the buffer is removed. Hence the term reference-frame shifting.

Figure 2:
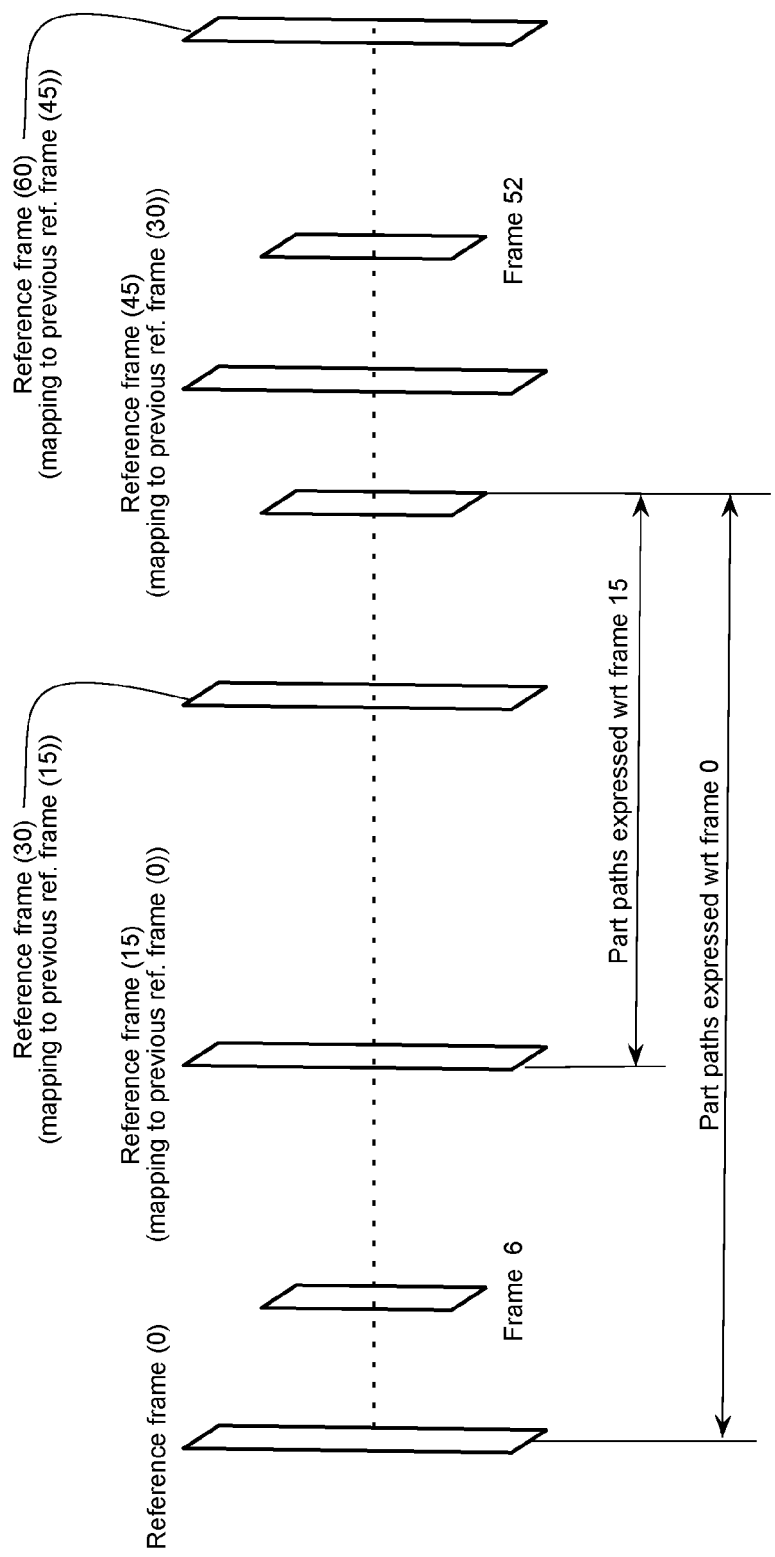
FIG. 2 shows a representation of a 2-second sequence of frames of full motion 30 fps video, and is used as an example to explain an aspect of the embodiment of the tracking method.

Hereinafter, the term FIFO refers to the FIFO reference-frame buffer 523. FIG. 2 shows a representation of the frames of a full motion video that are in a time-interval that starts with the first and ends with the last, i.e., the $N_R$'th reference frames in FIFO 523. The time interval is called the FIFO interval herein. We use this representation as an example to explain reference frame shifting. The illustrated example represents the frames after the method 100 accepts the first 2 s of a 30 fps video, so that drawing shows the first 60 accepted frames.

For $N_R$=5, there are 15 frames between reference frames. FIFO 523 maintains information about each of its 5 reference frames, including for each reference frame, an associated mapping between itself and a previous reference frame, so that reference frame has an associated mapping between frame 15 and reference frame 0, reference frame has an associated mapping between frame 30 and reference frame 15, and so forth. The information maintained for each reference frame in FIFO 523 further includes a data structure of information of respective paths of parts (a part-path-data-structure). Initially, i.e., when the reference frame is accepted, for each tracked part, the respective part's part-path-data-structure has information on the path up to the reference frame. As more frames are accepted by the method following the reference frame, the method updates all part paths existing in that reference frame's part-path-data-structure, and further adds new part paths in response to previously untracked parts being encountered in accepted frames. In one embodiment, the updating of the part-path-data-structure continues for a time interval equal to the FIFO interval, starting with the reference frame, so that in this example, the updating, including new part paths, possibly deleting some part paths, continues for the next 60 frames. In other words, updating of a reference frame's part-path-data-structure continues for as long as the subject reference frame is in FIFO 523, that is, until the reference frame is the oldest reference frame in FIFO 523. Thus, in one embodiment, a single part may have five tracks of up to 60 coordinates. If for any reason, the longest track is not available, one of the other tracks can be used.

In our example of FIG. 2, the first reference frame entering FIFO 523 523 is frame 0. For each newly accepted frame, each matched part in the frame is assigned to a path. As more frames are accepted into method 100, each detected part of each newly accepted frame is mapped to the most recent reference frame in FIFO 523. For example, when frame 6 is the current frame accepted into method 100, it is mapped to the most recent reference frame, in this case frame 0. This map between frame 6 and frame 0 is used to express all paths of any parts that detected in any intervening frame between frame 0 and frame 6. Similarly when the next frame, frame 7 is accepted in the method, it too is mapped to frame 0. When frame 15—the next reference frame—is accepted, it too gets mapped to frame 0, and that mapping is maintained, as is its part-path-data-structure (note, the part-path-data-structure of reference frame 0 also is maintained so long as frame 0 remains in FIFO). Because frame 15 is after $N_R$ frames, frame 15 is added to FIFO 523 as a new reference frame. For every video frame accepted by the method, the subprocess 105 maps the parts detected in that frame to the most recent reference frame, e.g. part in the 6th frame to the 0th frame, 33th to the 30th, 45th also to the 30th frame, and so forth. Based on the mapping of a part to its most recent reference frame, and the mappings between reference frames, subprocess 105 includes transforming part positions from the current frame to the appropriate reference frame and updating that reference frame's part-path-data-structure (the track data structure 521). For example, matched regions from frame 46 are mapped to each reference frame still in FIFO 523, so to reference frames 45, 30, 15 and 0, the part path data structures of these reference frames updated. While the longest tracks do include a concatenation of homographies, the number of mappings being concatenated is limited to four. For example, frame 55 includes the mapping from 55 to frame 45, 45 to 30, 30 to 15, and 15 to frame 0.

Classification

Subprocesses 103 and 105 determine tracked paths for parts of objects. Some of these objects are moving, and hence any tracked parts thereof are movers, while others are statics. Refer again to FIG. 5. Classification subprocess 107 considers tracked parts and classifies them into movers and statics. For this subprocess, our method considers short time intervals wherein the speed (velocity magnitude) of any moving part can be assumed to be constant and non-zero. The time interval is selected to be short enough such that moving parts do indeed maintain the constant velocity assumption, and long enough to enable valid statistical measured to be gathered to describe the paths. For aerial videos, we found that 2 seconds is short enough such that the constant speed assumption is maintained, and, for 30 fps or more, enough data (60 frames) is collected for valid statistics. Thus, in one embodiment, the time period is two seconds, corresponding to 60 frames of a 30 fps video. In the case of 60 fps video, which may be used when there is more motion, one embodiment assumes a classification window of 1 second, i.e., again corresponding to 60 frames. Of course other embodiments may use fewer frames, e.g., 30 frames.

Figure 3A:
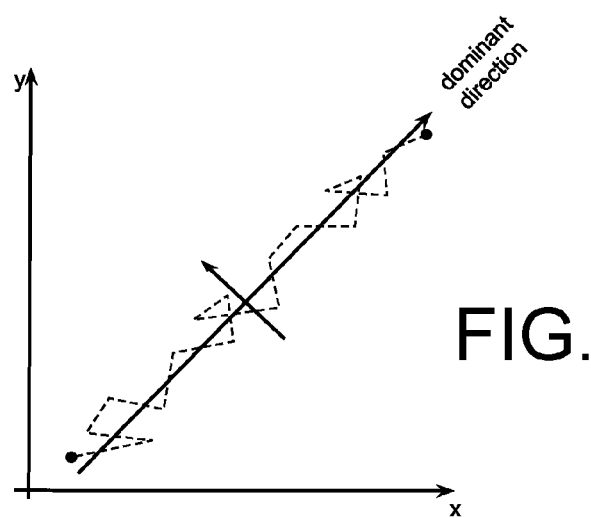
FIGS. 3A and 3B respectively show the tracks of a typical mover (FIG. 3A) and a static (FIG. 3B), according to an aspect of the present invention.
Figure 3B:
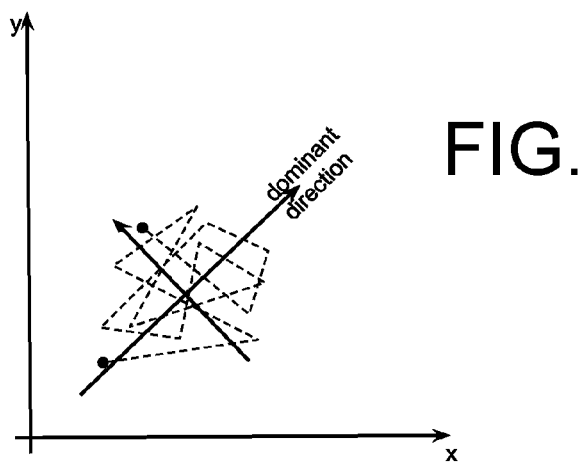

FIGS. 3A and 3B show typical paths of a mover (FIG. 3A) and a static (FIG. 3B), and used to provide motivation for the features that our method uses to describe paths for classification. The scale of the x and y axes in FIGS. 3A and 3B are different. For example, the overall bounding box of the motion in FIG. 3B might be in the order 1-2 pixels, while FIG. 3A might be an order of magnitude larger. Although in theory the path of a static would be a single point, in practice, because of noise, for example, from accumulated errors of calculated homographies, a static path typically shows erratic behavior, whereas a mover shows an overall trend of a straight line (within a time period short enough so that a mover has constant speed). From these drawings, we chose a particular set of path features to calculate for paths of parts in order to classify the paths into one of two classes.

In 531, subprocess 107 calculates a set of path descriptors (path features), representing object motion from the path tracks from subprocess 105. Note that in some embodiments, subprocesses 513 and 531 are combined into a step which both computes paths in the reference frame, and computes the path features for classification.

In one embodiment, 531 includes computing the following path features:

Path Elongation (Denoted $f_1$)

In one embodiment, a path of a length denoted pathLength (the number of frames in a path) is represented by a matrix of dimension 2×pathLength, where the first and the second rows represent the x-coordinates and y-coordinates, respectively of the path. The subprocess 107 determines a dominant direction for the path by applying PCA (Principle Component Analysis) on the path matrix, which determines two eigenvectors and corresponding eigenvalues $\lambda_{min}$ and $\lambda_{max}$. One feature we calculate is a measure of the elongation of the path, defined as:

$$f_1 = \lambda_{min}/\lambda_{max}.$$

From FIGS. 3A and 3B, we can see that the mover typically is elongated, while the static typically is less elongated.

Direction Changes (Zero-Crossings, Denoted $f_2$)

Compared to moving at a truly fixed velocity (speed and direction), a part typically does change its direction relative to the dominant direction. If we consider the line of dominant direction, and consider the velocity relative to the dominant direction, the velocity vector projected onto the dominant direction line, one can see that the direction, e.g., as measured by the angle of the path to the dominant direction line, the angle crosses zero many times. The number of such zero crossings divided normalized to per frame, is a feature of the path that may be included for mover/static classification. We define the normalized zero-crossing path feature:

$$f_2 = (\text{number\_of\_zero\_crosses})/(\text{pathLength}),$$

where number_of_zero_crosses is the number of zero crossings of the angle of the velocity vector relative to the line of dominant direction.

Mean Velocity (Denoted $f_3$)

The mean velocity $f_3$ of the path of a part may be expressed in pixels/frame or pixels per second, and determined as the mean value of the projection of the velocity vector on to the dominant direction line, i.e., the mean speed in the dominant direction. In one embodiment, we determine the velocity using a Kalman filter, while in another embodiment; we use the common Laplacian of Gaussian technique of smoothing the part path by a Gaussian filter, and calculating the derivative of the smoothed path to obtain a velocity vector at each respective frame of the path. Denoting (for this subprocess) by scalar $v_j$, j=1, . . . , pathLength the dominant-direction speeds in the path at frame j, one path feature useful for classification is the mean value of the speed:

$$f_3 = (\Sigma_{j=1}^{pathLength} v_j)/(pathLength).$$

Velocity-Variance-Based Feature (Denoted $f_4$)

Given the speeds in the dominant direction, another useful measure is one related to the deviation in the speed in the dominant direction. In one embodiment, this is expressed in units of velocity as $$f_4 = \Sigma_{j=1}^{pathLength}(v_j - f_3)^2/[(pathLength-1) \times f_3].$$

Alternate embodiments might use a different dominant-direction-speed-deviation measure. One such measure is the variance of the dominant-direction speeds in the path. One would expect a mover to have low deviation in speed. In one embodiment, the velocities are normalized by the mean velocity value $f_3$, so that the first alternative velocity variance, denoted $f_4'$, is $$f_4' = \Sigma_{j=1}^{pathLength}\{(v_j - f_3)^2\}/[(pathLength-1)^2 \times f_3^2].$$

In another embodiment, a yet a different alternative dominant-direction-speed deviation measure is used. For this, rather than the mean velocity, the median of the dominant-direction speed, denoted $v_{med}$ is used, and the measure of deviation is the mean (normalized) L1 norm of the dominant-direction speed:

$$deviation(v) = \Sigma_{j=1}^{pathLength} |v_j - v_{med}|/(pathLength \times v_{med}).$$

Path Monotonicity (Denoted $f_5$)

This path feature measures monotonicity trend of the sequence of Euclidean distances from the starting point of the path, denoted $d_i$, i=1 . . . pathLength, i.e., the sequence $$\{d_i\}, i=1 \ldots pathLength.$$

The rationale behind this region feature is that for short time period (1-2 seconds) of frames, movers will increase distance from starting point in (almost) every step, while static object will oscillate around the starting point. Thus, even paths with larger number of zero crosses can be classified as moving objects. Monotonic trend of the sequence $d_i$ can be calculated by Kendall's tau rank correlation coefficient. The idea is to calculate Kendall's tau (denoted $\tau(\bullet)$) for the sequence $\{d_i\}$ and some pre-defined monotonically increasing sequence $\{a_i\}$, for example, $a_i$=i. The monotonicity feature $f_5$ is defined as $$f_5 = \tau(\{d_i\}, \{a_i\})$$

Figure 4:
FIG. 4 shows an example track of a part track that has a relatively large number of zero velocity crossings (velocity change of directions).

FIG. 4. Shows, purely for illustrative purposes, a path that has large number of zero crossings, but that clearly trends in the positive x- and positive y-directions, with the trending being to move further and further away from the starting point.

Background ($f_6$)

Another feature we use for a path is the largest (over the path) average difference of the intensity in the part's region and the background of within the region occupied by the part, such average difference normalized by the number of pixels in the part. In more detail, for each input frame k, denote by $B_k(x,y)$ the frame's intensity values without any of the moving parts, wherein x,y denotes pixel coordinates. We call $B_k(x,y)$ the background, and it may be estimated using one of many standard techniques. One embodiment estimates the background using temporal median filtering of a plurality of input frame. In one version, $B_k(x,y)$ is determined by median filtering of the $K_R$ (e.g., 5) reference frames in the FIFO. For any part that has a region defined by a set of pixel coordinates, we are interested in the difference between the part's intensity and that of the background to the part. Consider a particular part indexed by j, denote the j'th part's region in frame k by $R_k^j$, and denote the number of pixels in the part by $N(R_k^j)$. The part's shape and size can change from frame to frame along the part's path. One path feature used for tracking is, for the track of part j, the maximum per pixel difference between the part's intensity and that of the background along the path. That is, for part j:

$$f_6 = \max_k\{\Sigma_{(x,y) \in R_k^j}[I_k(x,y) - B_k(x,y)]/N(R_k^j)\},$$

where:

k—index of video frame along a part's path,
j—index of part in video,
$R_k^j$—region covered by part j in frame k,
$N(R_k^j)$—number of pixels in region $R_k^j$
x,y pixel coordinates
$I_k(x,y)$ The gray level (the Luma or intensity) of pixel x,y in frame k
$B_k(x,y)$ The gray level (the Luma or intensity) of pixel x,y in the estimated background of frame k.

With these path features (also called path descriptors) calculated, the next step 533 of subprocess 107 carries classification, e.g., machine-learning-based classification using a decision tree-based classifier or some other classification method. Many methods are known to classify samples (tracks in our case) as being included in one class (inliers, in this case statics) or another class (the outliers in this case the movers) based on a set of features, which in one embodiment are the six path features. While classifiers are known within the field of machine learning, many of these methods were also known under the name of statistical pattern recognition.

In one embodiment, the classifying subprocess 533 uses the six features and training data, i.e., 533 uses a method of supervised learning. In one embodiment, classifying subprocess 533 uses a Support Vector Machine (SVM) classifier to classify each path of a part into inliers (statics) and outliers (movers). SVM classifiers are well known in the art for solving two-class classification. The training (535) uses videos that have moving objects with tracks similar to the type of videos used by the video tracking method. Thus, different SVMs would be trained for different types on input videos. In one example, we used over 7000 samples of inliers and outliers, e.g., from a training set of aerial videos, to train the SVM.

Classifying subprocess 107 identifies regions (parts of objects) that are movers for further processing in order to group the moving parts into objects.

Clustering

Figure 6:
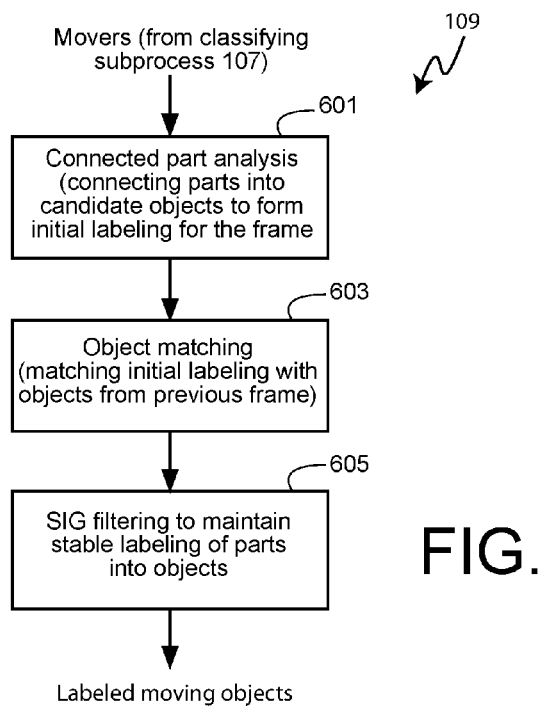
FIG. 6 shows a simplified flow chart of clustering subprocess, according to an embodiment of the present invention.

More than one of the parts classified as movers may belong to the same object, and the purpose of clustering is to group together those parts into moving objects. FIG. 6 shows a simplified flowchart of the clustering subprocess 109 that accepts parts (MSERs) classified as movers in classifying subprocess 107 and comprises machine implemented subprocesses including: in 603, carrying out connected part analysis to determine a connectedness graph of parts in each frame (independent of connectedness between parts in previous frames) to indicate candidate set of which objects might contain which parts, in 605 matching movers that were determined in 603 to be candidates of one part or another in the current frame with groupings from the previous frame, and in 607, post processing by SIG (short interval groupings) filtering is applied to improve the results.

Connected Part Analysis

To carry out connected part analysis, subprocess 603 constructs a weighted undirected graph denoted $(V,E)_k$ for each frame denoted by index k, where V is a set of vertices and E is a set of edges. This is carried out frame by frame. Denote each moving part from subprocess 107 by $p_i$, with different index i indicating a different part in the frame, so that all values of i cover all movers in frame k. In the connectedness graph, each part $p_i$ corresponds to one vertex in V. An edge between parts $p_i$ and $p_j$ exists in E if the probability that parts $p_i$ and $p_j$ belong to the same object is greater than some threshold denoted $\ominus$. Each edge E is given a weight $w_{i,j}$ which is indicative of the probability ($>\ominus$) that parts $p_j$ and $p_j$ belong to the same object. By labeling is meant assigning an object (a label) to a part.

One aspect of the invention is the use of features, called connectedness features herein, between two parts to connect parts that (likely) belong to the same object based on such features as proximity and speed. The reason we use the term likely is that we also improve on this connection be considering previous frames' labelings. Another aspect is that the connectedness features are normalized, such that the method is robust to scale change. For a current frame k, connected part analysis comprises determining the connectedness values, and estimating $w_{i,j}$ from the connectedness features using supervised learning. The following connectedness features between moving parts $p_i$ and $p_j$ in the frame are determined:

Velocity-Magnitude Difference ($c_1$)

We define vector $v_i$ as the velocity of the part $p_i$ in the current frame, and note that such vector $v_i$ can be expressed as a magnitude (also called intensity) denoted $vInt_i$ and an angle denoted $vAngle_i$ (the angle between velocity vector $v_i$ of the part $p_i$ in the current frame and positive part of the X-axis). In one embodiment, the velocity $v_i$ is estimated from the path history of the part $p_i$ using a Kalman filter within a path. In one embodiment, a velocity-magnitude difference connectedness feature $c_1$ is calculated as:

$$c_1 = \frac{|vInt_i - vInt_j|}{\min(vInt_i, vInt_j)},$$

where |•| denotes absolute value.

Velocity Angle Difference ($c_2$)

In one embodiment, another connectedness feature we determine is the cosine of the difference in velocity angles between two parts, calculated as:

$$c_2 = \cos(vAngle_i - vAngle_j).$$

Overlap Area ($c_3$)

Define $b_i$ as the axes-aligned bounding-rectangle of a part $p_i$ and define area ($b_i$) to be the area of such rectangle. Define the axes-aligned rectangle $b_{ij} = b_i \cap b_j$ as measure of the overlap region between parts $p_i$ and $p_j$. The overlap area feature $c_3$ is calculated as:

$$c_3 = \text{area}(b_{ij})/\min(\text{area}(b_i), \text{area}(b_j)).$$

Rectangle Distance ($c_4$)

We denote the distance between two arbitrary points $\alpha$ and $\beta$ as $d(\alpha, \beta)$ calculated as the Euclidian distance. The rectangle distance between two bounding rectangles $b_i$ and $b_j$, denoted as $d(b_i, b_j)$, is defined as the minimum distance between any two points in the two respective bounding rectangles of parts $p_i$ and $p_j$, respectively, i.e., $$d(b_i, b_j) = \min(d(\alpha, \beta) | \alpha \in b_i, \beta \in b_j).$$

Additionally, we denote by $d(b_i)$ the length of the diagonal of the bounding rectangle $b_i$. Feature $c_4$ is calculated as:

$$c_4 = d(b_i, b_j)/\max(d(b_i), d(b_j)).$$

Background Difference ($c_5$)

Figures 7A, 7B:
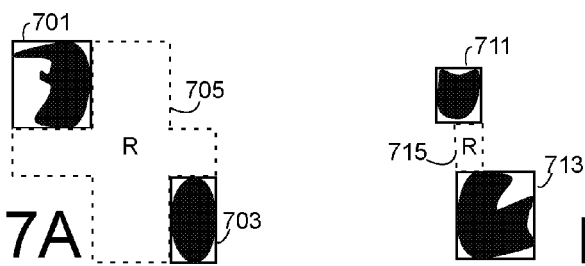
FIGS. 7A, 7B, and 7C are used to illustrate one of the connectedness features used in an embodiment of the invention, and show three pairs of parts, the bounding boxes of each part, and a region between each pair of bounding boxes.
Figure 7C:
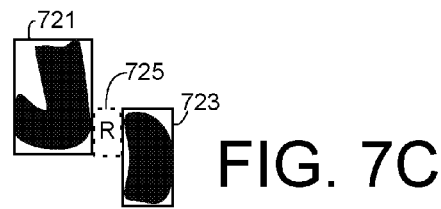

We define $R(b_i, b_j)$ a region (called the connecting region) between two bounding rectangles $b_i$ and $b_j$ of parts $p_i$ and $p_j$. Each of FIGS. 7A, 7B, and 7C respectively shows a pair of parts (shown in black), their respective bounding box pairs 701 & 703, 8711 & 713, 721 & 723, and the connecting region R (broken line rectangle) 705, 715, and 725, between the pair of bounding boxes, respectively. The fifth connectedness feature $c_5$ is proportional to the average over all pixels in the connecting region of the difference between the image and the background of the connecting region between two parts in a frame, calculated as:

$$c_5 = \Sigma_{(x,y) \in R(b_i, b_j)} \{I(x,y) - G(x,y)\}/\text{area}(R(b_i, b_j)),$$

where $I(x,y)$ is the current frame intensity level at pixel coordinates x and y in the region $R(b_i, b_j)$, and $G(x,y)$ is the estimated background at pixel coordinates x and y (in the region $R(b_i, b_j)$).

Overall Connectedness Probability

With the connectedness feature set $c_{i,j} = (c_1, c_2, c_3, c_4, c_5)$ between pairs of parts calculated, $w_{i,j}$ is calculated as a probability measure that is a function of the five connectedness features. For this, we use a set of manually labeled objects and parts thereof (a labeled data set) to determine the distribution of values of the five features, respectively for the case of parts being in, and not in the same object, and use the distributions to estimate $w_{i,j}$ in a supervised manner, i.e., using supervised learning. In more detail, the method includes a training phase comprising first discretizing any features that are in the continuous domain, and building two 5-dimensional ensembles (5-dimensional histograms) from the labeled data set, each dimension corresponding to one of the five features $c_1, c_2, c_3, c_4, c_5$. Based on labeled dataset, we build two sets of histograms of the five features, one set for YES denoting the cases of parts i and j being in the same object, and another set for NO, denoting parts i and j not in same object. Each dimension corresponds to one of features $c_1, c_2, c_3, c_4, c_5$. Hence there is a 5-dimensional histogram for estimating joint probability distribution for YES, and a 5-dimensional histogram for NO. In the training phase, we analyze our labeled dataset and for each of the 5-dimensional vectors $c_{i,j}$ and the objects of the parts i and j, we estimate corresponding bin for one of the 5-dimensional histograms. If parts i and j are in the same object, we update the YES histogram, otherwise we update the NO histogram. In the second phase, we calculate $c_1, c_2, c_3, c_4, c_5$. to form a vector $c_{i,j}$, we discretize each dimension to determine to which bin of the five-dimensional histograms the elements of vector $c_{i,j}$ correspond. The measure of probability $w_{i,j}$ is calculated as number of elements in that bin of the YES histogram divided by sum of number of elements in that bin for the YES and the NO histograms.

Matching Moving Objects from Frame to Frame

As a result of imperfect identification of moving objects in the connected part analysis of each frame, parts which belong to the same (moving) object in one frame might get separated into different objects in the next frame. Likewise, parts from different moving objects in one frame could be joined into one or more single objects in a later frame. The step 603 of matching moving objects is carried out after initial identification of potential moving objects to create correspondences between each object in the current frame and objects in the previous frame. Only then does the subprocess propagate object identifiers from frame to frame.

Defining Object Weights Between Frames for Matching

Based on the history of part-to-object association, define $_k t_{i,j}$ to be the weight between two objects, object i in previous frame k−1, denoted $Object_{k-1,i}$ and object j in the current frame k that immediately follows frame k−1, such object denoted as $Object_{k,j}$. The weight $_k t_{i,j}$ is calculated as follows:

$$_k t_{i,j} = \Sigma_{m \in {}^k M_j} h(m, {}^k M_{i \cap j}),$$

where ${}^{k-1}M_i$ is the set of parts belonging to object i in the previous frame, i.e. to $Object_{k-1,i}$, $${}^{k-1}M_i = \{part | part \in Object_{k-1,i}\},$$

${}^k M_j$ is the set of parts belonging to object j in the current frame, $${}^k M_j = \{part | part \in Object_{k,j}\},$$

${}^k M_{i \cap j}$ is the set of parts belonging to both object i in the previous frame and object j in the present frame k, that is, $${}^k M_{i \cap j} = {}^{k-1}M_i \cap {}^k M_j =$$

$$= \{part | part \in Object_{k-1,i} \text{ AND } part \in Object_{k,j}\}, \text{ and}$$

$h(m, {}^k M_{i \cap j})$ is the number of previous consecutive frame pairs up to current frame k in which part m belonged to the object j in the later frame and object i in the earlier frame, so if m was first found in object i in frame $k_0$ and the in frames 1, 2, . . . , k−1, and m was found in object j in frame $k_0+1$ and tracked in object j in all frames to frame k, then $$h(m, {}^k M_{i \cap j}) = k - k_0.$$

These numbers of frames are added up for all parts m in ${}^k M_{i \cap j}$ to determine the weight $_k t_{i,j}$ for current frame k.

After obtaining all weights $_k t_{i,j}$ for all pairs of objects i and j and the parts in the frame k, as described, one embodiment uses bipartite matching to find best correspondences for object ID propagation.

Figure 8:
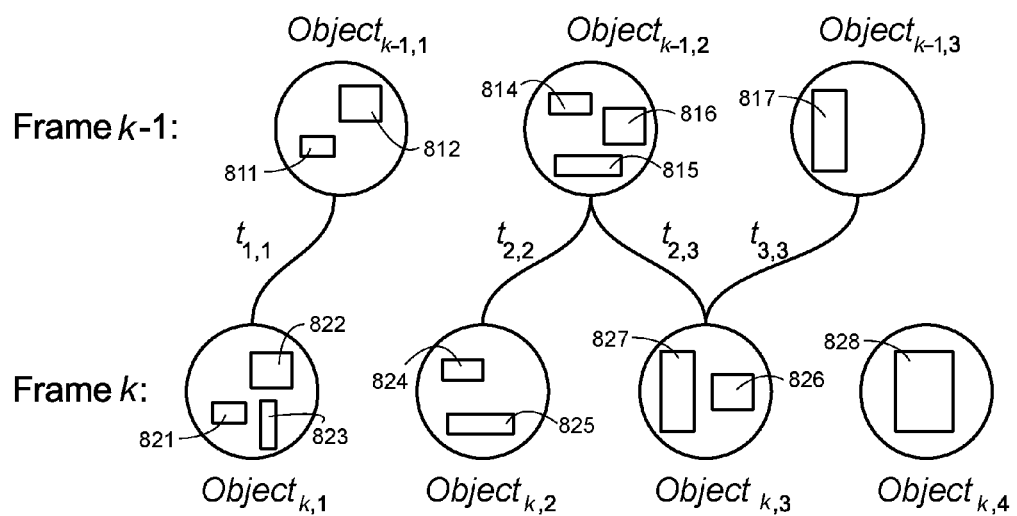
FIG. 8 shows, by way of example, the matching of objects from two consecutive frames according to an embodiment of the present invention.

FIG. 8 shows, by way of example, the matching of objects from two consecutive frames: frame k−1 followed by frame k. The circles are used to represent objects. Previous frame k−1 has three objects indexed by 1, 2, and 3, denoted $(Object_{k-1,1})(Object_{k-1,2})$ and $(Object_{k-1,3})$. Parts of objects, i.e., MSERs that have been grouped into one object or another, are shown as rectangles within the circles. Hence in the previous frame k−1, $Object_{k-1,1}$ includes two parts 811 and 812, object $Object_{k-1,2}$ includes three parts 814, 815, and 816, and $Object_{k-1,3}$ includes a single part 817. These parts 811, . . . , 817 are assumed to have been correctly labeled in frame k−1 as belonging to the respective objects as shown.

The four objects shown in frame k denoted, $(Object_{k,1})$, $(Object_{k,2})$, $(Object_{k,3})$ and $(Object_{k,4})$ show the results of connected analysis on frame k, thus the labeling of the parts are candidate object labeling.

Frame k's candidate object 1, $(Object_{k,1})$ includes two parts 821 and 822 that are matched to parts 811 and 812 labeled in frame k−1 as in object 1. $(Object_{k,1})$ further includes a new part 823 that does not seem to be connected to any part in the previous frame. Candidate object 2 $(Object_{k,2})$ has parts 824 and 825, and these are matched to parts 814 and 815, respectively, from the previous object 2 $(Object_{k-1,2})$, hence $Object_{k,2}$ is connected to $Object_{k-1,2}$ with a weight denoted $t_{2,2}$. Candidate object 3 $(Object_{k,3})$ has two parts 826 and 827, and is connected (part 826) to one part 816 from the previous object 2 $(Object_{k-1,2})$, and via part 827 to a part 817 from the previous object 3 $(Object_{k-1,3})$. Frame k has a completely new candidate object 4 $(Object_{k,4})$ with a new part 828.

As more and more frames are matched to a previous frame, and after bipartite matching, we end up with drawing like FIG. 8, but with weights $t_{i,j}$ having value 0 or 1. Objects are either connected or not.

Short-Interval-Groupings Filtering

Finding connected components in one frame can result in imperfect grouping of parts into objects, e.g., in the next frame. However, the inventors have found that the history of grouping in past frames can be used to improve results, e.g., to correctly regroup parts of some of objects that were misgrouped in a current frame.

Figure 9A:
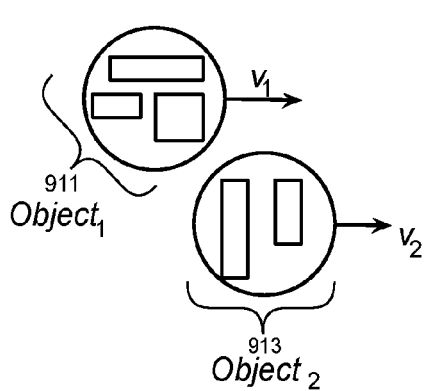
Figure 9B:
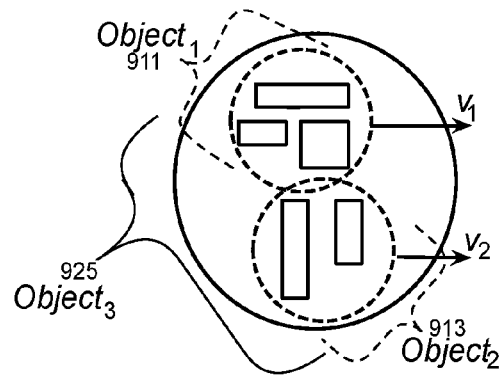
Figure 9C:
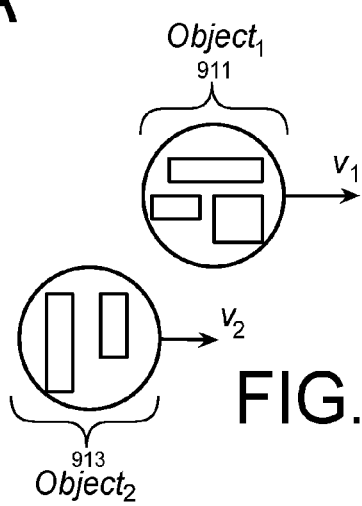
FIG. 9C shows the correct labeling of the frame of FIG. 9A.

FIGS. 9A and 9B illustrate in simplified form an example of how two parts can incorrectly be fused into a single part, e.g., when objects overtake each other. In FIG. 9A, two objects ($Object_1$ 911 and $Object_2$ 913) are shown very close to each other, with a similar velocities $v_1$ and $v_2$, respectively. FIG. 9B shows the situation at a later frame, when the two objects are quite close. The prior subprocesses of the method may incorrectly interpret $Object_1$ and $Object_2$ as one object ($Object_3$ 925) as shown in FIGS. 9B and 9C, respectively, some interval of time later, the two objects have separated. One embodiment includes ascertaining (by deduction) that $Object_1$ and $Object_2$ were correctly separated by the method in previous frames, such as that of FIG. 9A in previous frames (FIG. 9A). Such information can be used to correct error in the current frame, by separating $Object_3$ into $Object_1$ and $Object_2$. FIG. 9C shows the situation at some later frame, where $Object_1$ and $Object_2$ are again separate. In one embodiment, the frame of FIG. 9B may be corrected, e.g., because previous frames up to that of FIG. 9A had two objects as does the later frame as in 9C.

We call the subprocess 605 of correcting erroneous groupings "short-interval-groupings filtering" ("SIG filtering") to reflect its purpose of eliminating some short interval erroneous groupings.

In one embodiment, SIG filtering 605 is implemented using hysteresis filtering, which uses two hysteresis thresholds, one when something decreases, and a second for increasing values. We define a stability level to be a measure of how consistent labeling is from frame to frame. Suppose a part in an object has stable labeling from frame to frame. For each new frame, if the part has the same labeling, the stability level for the part increases (up to a saturation level). When a part is encountered whose labeling from one or more previous frames changes, the stability level is decreased down, eventually to a bottom level, below which the labeling of the part changes.

Figure 10:
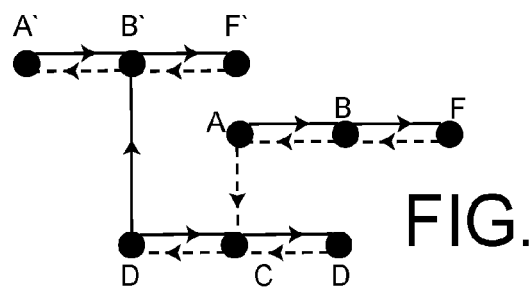
FIG. 10 shows an example how short interval grouping filtering using hysteresis on stability levels as objects are post processed to eliminate erroneous short interval groupings according to an embodiment of the present invention.

FIG. 10 shows an example of a labeling and SIG filtering for one embodiment, in which we define three stability levels, a middle level, a bottom level, and a top level. Each point represents a stability level, and each horizontal arrangement of points represents a labeling to an object. Consider a new part initially clustered into a first object, say object 1. The first time a part is assigned to an object, the stability level is set to medium, indicated in this example by point B of FIG. 10. Increases in stability level are indicated by a solid line and movement to the right, or up, while decreases are indicated by a dashed line (towards the left or down). In the next frame, if that same part is again clustered into object 1 (consistent labeling) as a result of frame-to-frame matching subprocess 605, the stability is moved to level F, which, in this example, is the highest stability level (saturation). However, if the part is assigned by frame-to-frame matching subprocess 605 to a different object (inconsistent labeling), the parts stability level is moved down toward A. Point F is point of saturation, in sense that consistent assignment in that point cause stability level to stay at that point. Point A is the lowest stability level at which the labeling of the part (the part's assignment to an object) does not change. Thus, so long as the stability remains along the line ABF, the result of our SIG filtering is that the part is finally assigned to the object $ID_1$. Consider however the stability level being at point A, and frame-to-frame matching subprocess 605 results in a second inconsistent label assignment. This causes the part's stability level to go below a threshold, which causes a move to point C (on line ECD), in which case, the part is assigned to a different object, say object 2. From this point, every consistent assignment (to object $ID_2$) from matching phase moves stability toward E, which is now considered as a saturation point, and every inconsistent assignment moves stability to the left toward D. As long as stability level is on the line DCE, the result of SIG filtering is that the part is assigned to object 2. Suppose the part's stability level is at point D, and in the next frame, frame-to-frame matching subprocess 605 results in a second inconsistent assignment. This would cause the stability level to move to a new point B' and the result of the SIG filtering is that the part is no longer assigned to object 2, but rather assigned to a different object, say object 3, (not necessarily object $ID_1$, previously corresponding to line ABF). A new line A'B'F' corresponds to object 3.

Such approach enables stability of the grouping subprocess 109, preventing parts to incorrectly change an object's parts change from frame to frame which would cause objects to flicker in size and shape.

System Embodiments

A second set of embodiments of the present invention relates to a system for processing video that includes a sequence of frames to determine and track moving objects in the video. The system furthermore may be constructed, by programming and/or specialized hardware modules, to carry out the steps of the method embodiments described above for identifying the different moving objects in each of the frames. An example of such a system 1100 is shown in FIG. 11 and may include or may be coupled to a source of video frames 1103 for receiving the video data. The system may for example be connectable to an imaging device 1131 such as a video camera for receiving the video data. In other versions, the source of video 1101 may be one or more files stored locally or remotely. In yet another version, the source of video may be a packetized video stream that is accepted into the system via a network. In one embodiment, the source of video 1101 carries out any pre-processing, for example downsampling or upsampling to a common size, extracting gray-scale, e.g., luma signal for the frames if in color, etc. System 1100 comprises a region-extractor 1103 that uses features such as MSERs or to extract regions, e.g., extremal regions that may be part of one or another object from each frame. The extracted parts of a current frame are used by a part matcher and tracker 1105 that includes a trail data structure 521 maintaining for each tracked part the track, e.g., as a list of coordinates, maintaining a list of lists. Part matcher and tracker 1105 comprises a part tracker 1121 that is operable to match each part from the previous frame (from structure 521) to a region in the current frame. Part matcher and tracker 1105 also includes a part tracker that tracks parts to form part tracks, maintained in the data structure 521. One feature of the part tracker is the changing of reference frames from time to time, with tracking being in relation to the most recent reference frame. In one version, part tracker 1123 maintains a reference frame buffer of a number of reference frames arranged in a first-in, first-out configuration (FIFO 523). In one embodiment, the changing of reference frames occurs periodically. Additionally, from time to time, e.g., periodically, e.g., in every frame or every few frames, parts that were not matched by matcher 1121 are introduced by tracker 1123 as new parts to be tracked and maintained in the trail data structure 521. The reference frame FIFO maintains mappings between reference frames, and parts are tracked for a pre-pre-defined or user-defined amount of time, e.g., for the time corresponding to the number of reference frames in the FIFO 523. A part path classifier 1107 is operative to accept tracked part paths generated by 1105, and to determine a set of path features, and using the path features, to classify each path as that of a moving part (a mover) or a stationary path (a static).

One aspect of system 1100 is the inclusion of a part-path clusterer 1109, operative to accept the paths of movers and to group parts that likely belong to the same object in order to generate moving objects and the tracking thereof. Clusterer 1109 when operating determines, for each frame, a set of connectedness features that capture the relationship between pairs of movers in the frame, including features related to the velocity difference (speed and direction), proximity of the parts, overlap between the parts, and background similarity of respective background of the parts. These connectedness features are normalized, such that the system 1100 is robust to scale. The clusterer 1109 is operative to estimate two multi-dimensional joint probability functions for the connectedness features, a first set for feature values of pairs belonging to the same object, and a second set for feature values of pairs not belonging. The estimated joint probability function sets are obtained by supervised learning using a training set of videos containing static and moving parts that have been manually grouped into objects, i.e., that are pre-labeled. The clusterer 1109 uses these estimated probability functions to determine a measure of probability of any two pairs of parts belonging to the same object, with any probability measure less than a pre-defined or user selected threshold being indicative of no connection.

Once the analysis is carried out for all pairs of moving objects in the current frame, leading to a candidate set of groupings for the current frame, Part-path clusterer 1109 is further operative to carry out matching of moving objects between frames by determining correspondences between each candidate object in the current frame with objects in the previous frame. To do this, the clusterer 1109 determines when operating a measure of correspondence from the current frame's candidate groupings to past object groupings based on the numbers of parts in a candidate object that are in objects that contain the respective parts in all previous frame. Once the weightings to previous objects are determined for all pairs of objects in the current frame, clusterer 1109 is operative to carry out bipartite matching to find the best correspondences for propagation of object groupings from frame to frame.

Another aspect of system 1100 is the inclusion in clusterer 1109 of a short interval grouping filter that can eliminate some short interval erroneous groupings, for example an erroneous grouping when two overtaking objects are fused in the short term to a single object, or when an object is temporarily and erroneously split into two objects before being labeled later as a single object. The short term interval grouping filter uses hysteresis filtering of an objects stability to ensure stable labeling.

One or more of different components of system 1100 may each comprise a processing engine for performing the respective component's function. The functionality of the different components of the system 1100 or different method steps of the method 100 may be implemented in separate processing units, or a processing system.

FIG. 12 shows a processing system embodiment 1200 that includes at least one programmable processor 1203 coupled to a storage subsystem 1211 that includes at least one form of memory, and may include other storage devices, such as optical or magnetic disks, or solid state static memory arranged to form mass-storage. It is to be noted that the processor or processors 1203 may be a general purpose, or a special purpose processor, and may be for inclusion in a device, e.g., a chip that has other components that perform other functions. Many details are not shown in the drawing in order not to obscure the main features of the invention. For example, a bus subsystem and other connections are not shown. Also not shown are any user interfaces, such as a display monitor or a user input device. The embodiment of FIG. 12 includes one or more input interfaces 1207 that may include user input mechanisms, e.g., pushbuttons, a keyboard, a pointing device, and so forth, and that enables the system to connect to a source of video, e.g., to a video camera. System 1200 further includes one or more output interfaces, including a display, and device(s) that accept the generated moving object data. In some versions, system 1200 further includes a special purpose parallel processor 1205 configured to calculate MSERs rapidly. One embodiment uses the system and method described in co-owned U.S. patent application Ser. No. 14/214,034 titled DETERMINING MAXIMALLY STABLE EXTERNAL REGIONS IN PARALLEL to inventors Grujic, et al., whose contents are incorporated herein by reference. More elements such as network connections, interfaces to various devices, and so forth, may be included, but are not illustrated in the drawings.

Storage subsystem 1211 includes, as is common, software to enable all the elements to work together, shown as operating system SW 1215. The memory of the storage subsystem 1211 may at some time hold part or all of a set of instructions shown as 1231 that when executed on the processing system 1200 implement the steps of the method embodiments described herein, e.g., method 100. In some versions, these instructions may be partitioned (of course with many common elements, and using common data structures) as part detection and tracking software ("SW") 1233 that, in some versions that include parallel MSER calculator 1205, use element 1205, part matching tracking and SW 1235, classification of tracked parts SW 1237 that when operating, classifies tracks to movers and statics, and mover clustering SW 1239 that groups parts into object in one frame, then connects these objects with previously grouped objects, and then carried out filtering to eliminate erroneous short term groupings. Furthermore, the storage subsystem 1211, when the system 1200 is operational, may include one or more image(s) or portions thereof, track data 1243, parameters and training data 1245, and reference images data 1247.

Note that while a processing system 1200 such as shown in FIG. 12 may be prior art in its original form, e.g., its form without any special hardware such as parallel calculator 1231, a system that includes the instructions to implement aspects of the methods for processing video data to track moving objects is not prior art, and for at least this reason, FIG. 12 is not labeled as prior art.

Computer-Readable Medium Embodiments

Yet another set of embodiments include a non-transitory machine-readable medium that stores instructions that when executed by one or more processors of a processing system, such as system 1200, causes carrying out a method as described in any of the method embodiments described herein, e.g., method 100 and its variations.

Application System Embodiments

In another aspect, the present invention relates to an application system, such as for example a computerized system for an automotive applications, e.g., to include with a controller in an automobile, or such as an airborne system, or a surveillance system, or any other system or automated system which may use information regarding moving objects in its surrounding. The application system comprises the system as described in FIG. 11, e.g., when implemented as shown in FIG. 12 or in other ways, and a controller. The controller may use such data for controlling or assisting in controlling of its functioning. For example, when the application system includes a controller in an automobile, the system may be operative to use the tracked object information to cause the controller to control or assist in controlling driving of the vehicle. Similarly, the application system may be used in a surveillance system to observe and the controller to set up alarm according to one or more characteristics of tracked moving objects. The application system may be for airborne use with an airborne camera to observe and make decisions about tracked objects. Such an application system may for example comprise a microprocessor or FPGA, the invention not being limited thereto. By way of illustration, in general, an application system comprises a system for processing video data, such as system 1100 and a controller for deriving control instructions, e.g. driving instructions, from the tracked object information.

Thus, one or more aspects of the present invention can be implemented in digital electronic circuitry, or in computer hardware, firmware, software, or in combinations thereof.

General

In this description, it is assumed that a video frame when digitized contains a two-dimensional arrangement (an array) of pixels each having a gray-scale value. The invention however is not limited to monochrome images, or even visual images. For example, the methods described herein may be used for infrared (IR) images, for multispectral images as used in remote sensing, color images, and so forth. As one example, each pixel of a color image has typically has three coordinates that may be in, or readily transformed to first coordinate that is a measure of intensity or of luminance, and one or more other coordinates that provide the color information, e.g., as a measure of chrominance or of hue and saturation. The methods described herein can be used on one or more of these coordinates.

While one embodiment uses the weighted Euclidean norm as the distance measure for matching in the matching and tracking subprocess 105, other embodiments may use a different distance measure. One embodiment uses the weighted sum of absolute distances (the weighted L1 norm), another uses the weighted L∞ norm, yet another uses the squared weighted Euclidean distance, and yet another uses the (unweighted) Euclidean norm.

While embodiments described herein use specific data structures such as lists, vectors, and other data structures, such structures are described as one example, and the invention is in no way limited to the type of data structure used in the example.

While one embodiment of the clustering and clusterer uses five specific connectedness features, alternate embodiments may use a different number of connectedness features, and/or connectedness features that are defined differently.

While one embodiment of the tracking uses six specific path features, alternate embodiments may use a different number of path features, and/or path features that are defined differently.

While the term subprocess is used to describe a part of a method, this does not indicate that this is in any way related to sub-procedures, subroutines, or any other distinct elements of a computer program, but rather to a step in the method (or process).

Unless specifically stated otherwise, as apparent from the following discussions, it is appreciated that throughout the specification discussions utilizing terms such as "processing," "computing," "calculating," "determining," "ascertaining," "analyzing," or the like, refer to the action and/or processes of a device, a processor, a computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory.

The methodologies described herein are, in one embodiment, performable by one or more processors that accept machine-readable instructions, e.g., as firmware or as software, that when executed by one or more of the processors carry out at least one of the methods described herein. In such embodiments, any processor capable of executing a set of instructions (sequential or otherwise) that specify actions to be taken may be included. Thus, one example is a programmable DSP device. Another is the CPU of a microprocessor or other computer-device, or the processing part of a larger ASIC. A processing system may include a memory subsystem including main RAM and/or a static RAM, and/or ROM. A bus subsystem may be included for communicating between the components. The processing system further may be a distributed processing system with processors coupled wirelessly or otherwise, e.g., by a network. If the processing system requires a display, such a display may be included. The processing system in some configurations may include a sound input device, a sound output device, and a network interface device. The memory subsystem thus includes a machine-readable non-transitory medium that is coded with, i.e., has stored therein a set of instructions to cause performing, when executed by one or more processors, one of more of the methods described herein. Note that when the method includes several elements, e.g., several steps, no ordering of such elements is implied, unless specifically stated. The instructions may reside in the hard disk, or may also reside, completely or at least partially, within the RAM and/or other elements within the processor during execution thereof by the system. Thus, the memory and the processor also constitute the non-transitory machine-readable medium with the instructions.

Furthermore, a non-transitory machine-readable medium may form a software product. For example, it may be that the instructions to carry out some of the methods, and thus form all or some elements of the inventive system or apparatus, may be stored as firmware. A software product may be available that contains the firmware, and that may be used to "flash" the firmware.

Note that while some diagram(s) only show(s) a single processor and a single memory that stores the machine-readable instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a non-transitory machine-readable medium coded with, i.e., having stored therein a set of instructions for execution on one or more processors, e.g., one or more processors that are part of the receiver forming a pen stroke capture system.

Note that, as is understood in the art, a machine with application-specific firmware for carrying out one or more aspects of the invention becomes a special purpose machine that is modified by the firmware to carry out one or more aspects of the invention. This is different than a general purpose processing system using software, as the machine is especially configured to carry out the one or more aspects. Furthermore, as would be known to one skilled in the art, if the number the units to be produced justifies the cost, any set of instructions in combination with elements such as the processor may be readily converted into a special purpose ASIC or custom integrated circuit. Methodologies and software have existed for years that accept the set of instructions and particulars of, for example, the processing engine 131, and automatically or mostly automatically great a design of special-purpose hardware, e.g., generate instructions to modify a gate array or similar programmable logic, or that generate an integrated circuit to carry out the functionality previously carried out by the set of instructions. Thus, as will be appreciated by those skilled in the art, embodiments of the present invention may be embodied as a method, an apparatus such as a special purpose apparatus, an apparatus such as a data DSP device plus firmware, or a non-transitory machine-readable medium. The machine-readable carrier medium carries host device readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form a computer program product on a non-transitory machine-readable storage medium encoded with machine-executable instructions.

Reference throughout this specification to "one embodiment," "an embodiment," some embodiments," "or "embodiments" means that a particular feature, structure or characteristic described in connection with the embodiment or embodiments is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, drawing, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a host device system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference, except in those jurisdictions where such incorporation by references is not permitted.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Any formulas given above are merely representative of procedures that may be used. Functionality may be added or deleted from the block diagrams, operations may be interchanged among functional blocks or flow chart elements, and steps may be added or deleted to described methods.

Thus, while there has been described what are believed to be the preferred embodiments of the invention, those skilled in the art will recognize that other and further modifications may be made thereto without departing from the scope of the invention as defined by the claims attached hereto, and it is intended also to claim all such changes and modifications as fall within the scope of the invention.

What is claimed is:

1. A method of operating a hardware system to process a video that includes an ordered sequence of frames, the method to determine and track moving objects in the video, the method comprising:
   accepting frames of a video from a source of video data;
   detecting and extracting regions from the accepted frames, each region possibly being a part of an object;
   matching parts including using the extracted parts of a current frame and matching each part from a previous frame to a region in the current frame, a previous frame being a frame previous to the current frame in the sequence;
   tracking the matched parts to form part tracks, the tracking being in relation to one or more most recent reference frames, the tracking comprising changing reference frames from time to time;
   determining a set of path features for each tracked part path, and using the determined path features to classify each path as that of a moving part (a mover) or a stationary path (a static); and
   clustering the paths of movers, including grouping parts of movers that likely belong to a single object, in order to generate one or more single moving objects, and in order to track the single moving objects.

2. The method of claim 1, wherein the source of video data comprises at least one of a video camera, a computer-readable file, and a packetized video stream.

3. The method of claim 1, wherein the extracted regions are extremal regions.

4. The method of claim 3, wherein the extremal regions are each a maximal stable extremal region (MSER).

5. The method of claim 1, wherein the changing of reference frames from time to time is periodic with a change-reference-frame period.

6. The method of claim 1, wherein the tracking comprises from time to time introducing new parts to track that were not previously matched.

7. The method of claim 6, wherein the introducing new parts from time to time is periodic with a new-part-period.

8. The method of claim 1, wherein the clustering comprises for the current frame, determining a set of connectedness features that capture the relationship between pairs of movers in the current frame.

9. The method of claim 8, wherein the connectedness features include at least two features of the set consisting of features related to a velocity difference of pairs of movers, features related to proximity of the mover parts, features related to overlap between the mover parts, and features related to background similarity of respective backgrounds of the mover parts.

10. The method of claim 9, wherein the connectedness features are normalized, such that the method robust to scale.

11. The method of claim 8, wherein the clustering includes estimating two sets of probability functions for the connectedness features, a first set of probability functions for features of pairs belonging to the same part and a second set of probability functions for features of pairs not belonging.

12. The method of claim 11, wherein estimating the probability function sets are comprises carrying out supervised learning using a training set of videos containing static and moving parts that have pre-labeled into moving and non-moving objects.

13. The method of claim 11, wherein the clustering comprises using the estimated probability functions to determine a measure of probability of any two pairs of parts belonging to the same object.

14. The method of claim 1, wherein the clustering comprises matching of moving objects between frames.

15. The method of claim 14, wherein the matching of moving objects between frames comprises for a candidate object in the current frame determining one or more correspondences between with one or more objects in the previous frame, if there is at least one object in the previous frame having a correspondence with the candidate object.

16. The method of claim 15, wherein the matching of moving objects comprises determining a measure of correspondence from candidate groupings in the current frame to past object groupings based on the numbers of parts in a candidate object in the current frame that are in objects that contain the respective parts in one or more previous frames.

17. The method of claim 1, wherein the clustering comprises carrying out bipartite matching to find correspondences for propagation of object groupings from frame to frame.

18. The method of claim 1, wherein the clustering comprises short interval grouping (SIG) filtering that may eliminate one or more short interval erroneous groupings.

19. A system for processing video that includes an ordered sequence of frames to determine and track moving objects in the video, the system comprising:
  an input port operative to accept video frames from a source of video frames;
  a region-extractor operative to detect and extracting regions from the accepted frames, each region possibly being a part of an object;
  a part matcher operative to match parts including using the extracted parts of a current frame and matching each part from a previous frame to a region in the current frame, a previous frame being a frame previous to the current frame in the sequence;
  a part tracker operative to track the matched parts to form part tracks, the tracking being in relation to one or more most recent reference frames, the tracking comprising changing reference frames from time to time;
  a path feature classifier operative to determine a set of path features for each tracked part path, and to use the determined path features to classify each path as that of a moving part (a mover) or a stationary path (a static); and
  a clusterer operative to cluster the paths of movers, including grouping parts of movers that likely belong to a single object, in order to generate one or more single moving objects, and in order to track the single moving objects.

20. The system of claim 19, wherein the source of video data comprises at least one of a video camera, a computer-readable file, and a packetized video stream.

21. The system of claim 19, wherein the extracted regions are extremal regions.

22. The system of claim 21, wherein the extremal regions are each a maximal stable extremal region (MSER).

23. The system of claim 19, wherein the changing of reference frames from time to time is periodic with a change-reference-frame period.

24. The system of claim 19, wherein the tracking comprises from time to time introducing new parts to track that were not previously matched.

25. The system of claim 24, wherein the introducing new parts from time to time is periodic with a new-part-period.

26. The system of claim 19, wherein the clustering by the clusterer comprises for the current frame, determining a set of connectedness features that capture the relationship between pairs of movers in the current frame.

27. The system of claim 26, wherein the connectedness features include at least two features of the set consisting of features related to a velocity difference of pairs of movers, features related to proximity of the mover parts, features related to overlap between the mover parts, and features related to background similarity of respective backgrounds of the mover parts.

28. The system of claim 27, wherein the connectedness features are normalized, such that the method robust to scale.

29. The system of claim 25, wherein the clustering includes estimating two sets of probability functions for the connectedness features, a first set of probability functions for features of pairs belonging to the same part and a second set of probability functions for features of pairs not belonging.

30. The system of claim 29, wherein estimating the probability function sets are comprises carrying out supervised learning using a training set of videos containing static and moving parts that have pre-labeled into moving and non-moving objects.

31. The system of claim 29, wherein the clustering comprises using the estimated probability functions to determine a measure of probability of any two pairs of parts belonging to the same object.

32. The system of claim 19, wherein the clustering comprises matching of moving objects between frames.

33. The system of claim 32, wherein the matching of moving objects between frames comprises for a candidate object in the current frame determining one or more correspondences between with one or more objects in the previous frame, if there is at least one object in the previous frame having a correspondence with the candidate object.

34. The system of claim 33, wherein the matching of moving objects comprises determining a measure of correspondence from candidate groupings in the current frame to past object groupings based on the numbers of parts in a candidate object in the current frame that are in objects that contain the respective parts in one or more previous frames.

35. The system of claim 19, wherein the clustering comprises carrying out bipartite matching to find correspondences for propagation of object groupings from frame to frame.

36. The system of claim 19, wherein the clustering comprises short interval grouping (SIG) filtering that may eliminate one or more short interval erroneous groupings.

37. The system of claim 19, comprising one or more processors and a storage subsystem, the storage subsystem including instructions that when executed by one or more of the processors, carry out the operations of the region-extractor, the part matcher, the part tracker, the part feature classifier, and the clusterer.

38. A non-transitory machine-readable medium comprising instructions that when executed by one or more processors of a processing system coupled to a source of video data carry out a method of processing a video that includes an ordered sequence of frames, the method to determine and track moving objects in the video, the method comprising:

accepting frames of the video from the source of video data;

detecting and extracting regions from the accepted frames, each region possibly being a part of an object;

matching parts including using the extracted parts of a current frame and matching each part from a previous frame to a region in the current frame, a previous frame being a frame previous to the current frame in the sequence;

tracking the matched parts to form part tracks, the tracking being in relation to one or more most recent reference frames, the tracking comprising changing reference frames from time to time;

determining a set of path features for each tracked part path, and using the determined path features to classify each path as that of a moving part (a mover) or a stationary path (a static); and clustering the paths of movers, including grouping parts of movers that likely belong to a single object, in order to generate one or more single moving objects, and in order to track the single moving objects.

* * * * *